US012684523B2

(12) United States Patent
Kuo et al.

(10) Patent No.: US 12,684,523 B2

(45) Date of Patent: Jul. 14, 2026

(54) STATION DEVICE, WI-FI SYSTEM, AND ASSOCIATED POSITIONING METHOD

(71) Applicant: MEDIATEK Inc., Hsinchu City (TW)

(72) Inventors: Chi-Shiang Kuo, Hsinchu City (TW); Yuan-Chin Wen, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 287 days.

(21) Appl. No.: 18/651,746

(22) Filed: May 1, 2024

(65) Prior Publication Data

US 2024/0381291 A1 Nov. 14, 2024

Related U.S. Application Data

(60) Provisional application No. 63/500,641, filed on May 8, 2023.

(51) Int. Cl.
| | |
|---|---|
| *H04W 64/00* | (2009.01) |
| *G01S 5/02* | (2010.01) |
| *G01S 5/08* | (2006.01) |
| *H04W 84/12* | (2009.01) |

(52) U.S. Cl.
CPC ........... *H04W 64/00* (2013.01); *G01S 5/0221* (2013.01); *G01S 5/0242* (2013.01); *G01S 5/08* (2013.01); *G01S 2205/02* (2020.05); *H04W 84/12* (2013.01)

(58) Field of Classification Search
CPC .... H04W 64/00; G01S 5/0221; G01S 5/0242; G01S 5/08
USPC ....................................... 455/456.1
See application file for complete search history.

(56) References Cited

U.S. PATENT DOCUMENTS

| | | | |
|---|---|---|---|
| 2014/0004877 A1* | 1/2014 | Van Diggelen ....... | G01S 13/876 |
| | | | 455/456.1 |
| 2019/0166453 A1* | 5/2019 | Edge .......................... | G01S 5/06 |

* cited by examiner

*Primary Examiner* — Joel Ajayi

(74) *Attorney, Agent, or Firm* — McClure, Qualey & Rodack, LLP

(57) ABSTRACT

A station device, a Wi-Fi system, and an associated positioning method are provided. The Wi-Fi system includes an AP1 device, an AP2 device, and the station device. The AP1 and the AP2 devices respectively transmit a first Wi-Fi signal and a second Wi-Fi signal. The station device receives a first-first Wi-Fi signal and a first-second Wi-Fi signal originating from the AP1 device. The station device receives a second-first Wi-Fi signal and a second-second Wi-Fi signal originating from the AP2 device. A first angle of arrival is estimated based on the first-first Wi-Fi signal and first-second Wi-Fi signal, and a second angle of arrival is estimated based on the second-first Wi-Fi signal and the second-second Wi-Fi signal. Based on the first angle of arrival, the second angle of arrival, and coordinate positions of the AP1 and AP2 devices, the station device performs a triangulation calculation to estimate its coordinate position.

20 Claims, 10 Drawing Sheets

STATION DEVICE, WI-FI SYSTEM, AND ASSOCIATED POSITIONING METHOD

This application claims the benefit of U.S. provisional application Ser. No. 63/500,641, filed May 8, 2023, the disclosure of which is incorporated by reference herein in its entirety.

TECHNICAL FIELD

The disclosure relates in general to a station device, a Wi-Fi system, and an associated positioning method, and more particularly to a station device, a Wi-Fi system, and an associated positioning method capable of locating an indoor position of the station device based on the angle of arrival (AoA).

BACKGROUND

Global positioning system (hereinafter, GPS) has been widely used for outdoor navigation for decades. As the GPS signal is weak in the building, GPS is not suitable for indoor environments, another approach for indoor positioning purposes is required.

The popularity of Wi-Fi has grown steadily, and many Wi-Fi products have been developed. Nowadays, two indoor positioning methods are applied to Wi-Fi devices: GPS-trilateration-based indoor positioning system (IPS) and fingerprinting-based IPS.

FIG. 1 is a schematic diagram illustrating the GPS-trilateration-based indoor positioning. Based on the trilateration method, the location of a device under test (DUT) 13 in a building is determined based on the positions of three or more reference positions (for example, access points AP1, AP2, and AP3 devices 11a, 11c, 11e). However, the GPS-trilateration-based indoor positioning needs to refer to the absolute coordinates of the reference positions.

Although the absolute coordinates of the reference positions can be set in a flexible manner (manually by the user or automatically by referring to the user's latest available GPS positions), both setting approaches have their limitations. In short, the manual setting relies on a user having sufficient technical skills, and the accuracy of the automatic setting is doubtful. Alternatively speaking, a user without related technical skill is incapable of setting the absolute coordinates of the reference positions. Besides, the accuracy of the automatic setting is questionable because the absolute coordinates of the reference positions are merely approximated by referring to the last GPS outdoor positions before the user enters an indoor environment.

The fingerprinting-based IPS involves a fingerprint database establishment stage and an online matching stage. In the fingerprint database establishment stage, the received signal strength indicators (RSSI) at certain reference positions in an indoor environment are measured/extracted, and the physical locations of the reference positions and their corresponding RSSI values need to be saved as fingerprint values in a fingerprint database. In the online matching stage, when a user enters the building, the RSSI values collected by the user's device (device fingerprint) are considered indicators and cross-compared with the reference RSSI values stored in the fingerprint database to approximate the user's indoor position. Then, the user's indoor position is determined by referring to the reference positions whose RSS values are closest to/matched with the RSSI values collected by the user's device.

That is, the RSSI values of the nearest neighboring reference positions are compared to identify the indoor position of the user's device according to the fingerprinting-based IPS. Unlike the GPS-trilateration-based IPS, the fingerprinting-based IPS does not require the absolute coordinates of the reference positions. However, the fingerprint database establishment stage is time-consuming, and the RSSI values stored in the fingerprint database must be updated whenever any of the access points (AP) is replaced or added. In other words, the necessity of repetitively saving the RSSI values becomes the fatal weakness of the fingerprinting-based IPS.

As indicated, both the GPS-trilateration-based IPS and the fingerprinting-based IPS have their shortages. There is an ongoing requirement for an accurate indoor position system that can be used by a user in a straightforward manner.

SUMMARY

The disclosure is directed to a station device, a Wi-Fi system, and a positioning method.

According to one embodiment, a station device is provided. The station device includes a first antenna, a second antenna, a communication interface, and a control circuit. The first antenna receives a first-first Wi-Fi signal and a second-first Wi-Fi signal. The first-first Wi-Fi signal is transmitted along a first-first transmission path, and the second-first Wi-Fi signal is transmitted along a second-first transmission path. The second antenna receives a first-second Wi-Fi signal and a second-second Wi-Fi signal. The first-second Wi-Fi signal is transmitted along a first-second transmission path, and the second-second Wi-Fi signal is transmitted along a second-second transmission path. The first-first Wi-Fi signal and the first-second Wi-Fi signal originate from a first Wi-Fi signal transmitted by a first access point device. The second-first Wi-Fi signal and the second-second Wi-Fi signal originate from a second Wi-Fi signal transmitted by a second access point device. The communication interface is electrically connected to the first antenna and the second antenna. The communication interface calculates a first angle of arrival based on a separation distance between the first antenna and the second antenna and a first path difference between the first-first Wi-Fi signal and the first-second Wi-Fi signal. The communication interface calculates a second angle of arrival based on the separation distance and a second path difference between the second-first Wi-Fi signal and the second-second Wi-Fi signal. The control circuit is electrically connected to the communication interface. The control circuit performs a triangulation calculation to estimate a coordinate position of the station device based on the first angle of arrival, the second angle of arrival, a coordinate position of the first access point device, and a coordinate position of the second access point device.

According to another embodiment, a Wi-Fi system is provided. The Wi-Fi system includes a first access point device, a second access point device, and the station device. The first access point device transmits a first Wi-Fi signal, and the second access point device transmits a second Wi-Fi signal. The station device includes a first antenna, a second antenna, a communication interface, and a control circuit. The first antenna receives a first-first Wi-Fi signal and a second-first Wi-Fi signal. The first-first Wi-Fi signal is transmitted along a first-first transmission path, and the second-first Wi-Fi signal is transmitted along a second-first transmission path. The second antenna receives a first-second Wi-Fi signal and a second-second Wi-Fi signal. The first-second Wi-Fi signal is transmitted along a first-second transmission path, and the second-second Wi-Fi signal is transmitted along a second-second transmission path. The first-first Wi-Fi signal and the first-second Wi-Fi signal originate from the first Wi-Fi signal. The second-first Wi-Fi signal and the second-second Wi-Fi signal originate from the second Wi-Fi signal. The communication interface is electrically connected to the first antenna and the second antenna. The communication interface calculates a first angle of arrival based on a separation distance between the first antenna and the second antenna and a first path difference between the first-first Wi-Fi signal and the first-second Wi-Fi signal. The communication interface calculates a second angle of arrival based on the separation distance and a second path difference between the second-first Wi-Fi signal and the second-second Wi-Fi signal. The control circuit is electrically connected to the communication interface. The control circuit performs a triangulation calculation to estimate the coordinate position of the station device based on the first angle of arrival, the second angle of arrival, the coordinate position of the first access point device, and the coordinate position of the second access point device.

According to an alternative embodiment, a positioning method applied to a Wi-Fi system having a first access point device, a second access point device, and a station device is provided. The positioning method includes the following steps. The first access point device transmits a first Wi-Fi signal. The second access point device transmits a second Wi-Fi signal. Through a first antenna, the station device receives a first-first Wi-Fi signal being transmitted along a first-first transmission path, and receives a second-first Wi-Fi signal being transmitted along a second-first transmission path. Through a second antenna, the station device receives a first-second Wi-Fi signal being transmitted along a first-second transmission path, and receives a second-second Wi-Fi signal being transmitted along a second-second transmission path. The first-first Wi-Fi signal and the first-second Wi-Fi signal originate from the first Wi-Fi signal, and the second-first Wi-Fi signal and the second-second Wi-Fi signal originate from the second Wi-Fi signal. The station device calculates a first angle of arrival based on a separation distance between the first antenna and the second antenna and a first path difference between the first-first Wi-Fi signal and the first-second Wi-Fi signal. The station device calculates a second angle of arrival based on the separation distance and a second path difference between the second-first Wi-Fi signal and the second-second Wi-Fi signal. After the first angle of arrival and the second angle of arrival are calculated, the station device performs a triangulation calculation to estimate the coordinate position of the station device based on the first angle of arrival, the second angle of arrival, the coordinate position of the first access point device, and the coordinate position of the second access point device.

Figure 1:
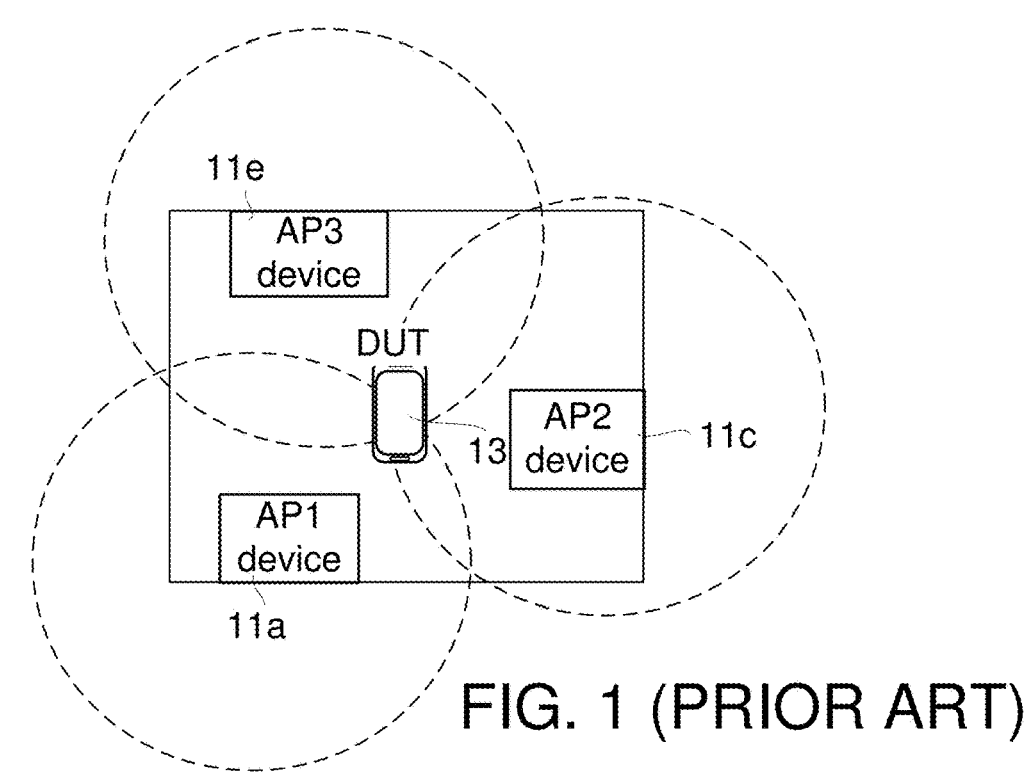
FIG. 1 (prior art) is a schematic diagram illustrating the GPS-trilateration-based indoor positioning.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

As illustrated above, the conventional Wi-Fi IPS needs further improvement. A Wi-Fi IPS, according to the present application, is implemented based on triangulation. Triangulation is the process of determining the location of a point by forming triangles to a target point from known points. Based on triangulation, the coordinate of the target point (that is, the DUT) of the triangle can be calculated from the coordinates of two known points (that is, the AP1, AP2 devices) and angles (that is, the first angle of arrival $\theta_{aoa1}$, and the second angle of arrival $\theta_{aoa2}$).

Figure 2A:
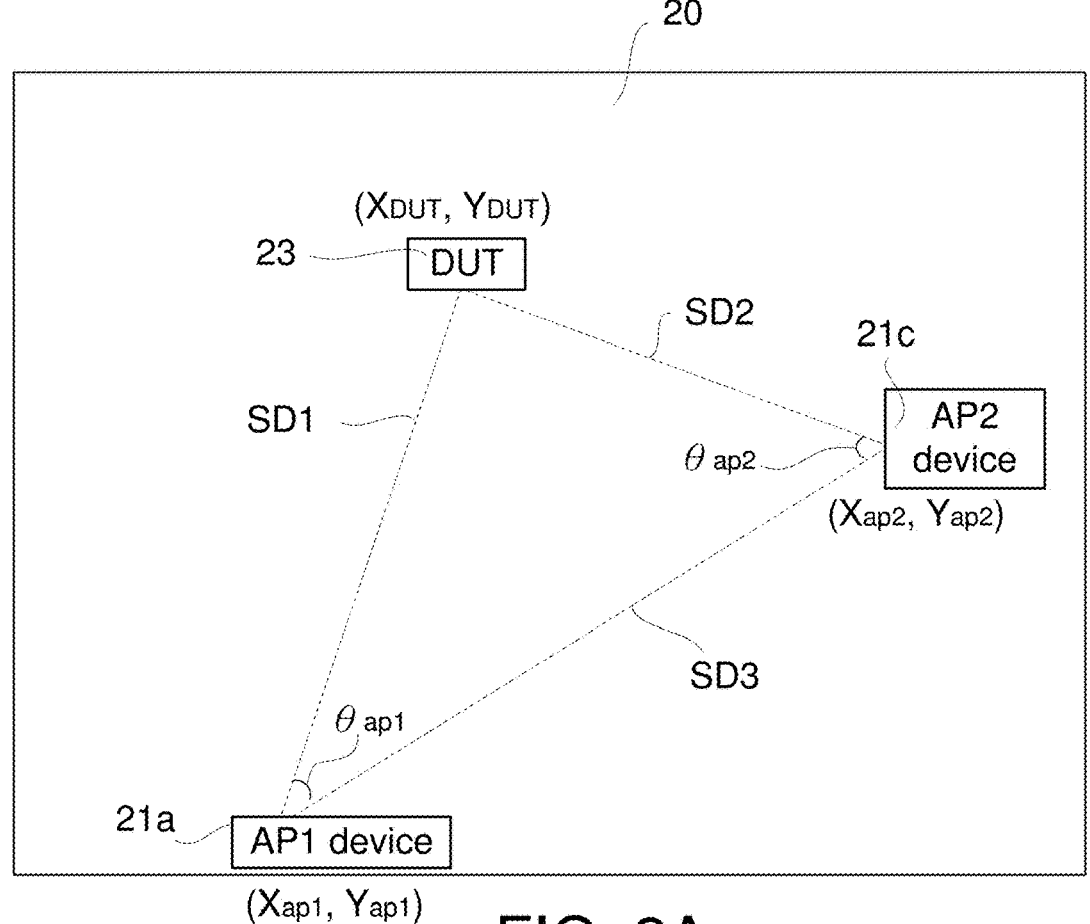
FIG. 2A is a schematic diagram illustrating that the triangulation is utilized for Wi-Fi IPS according to the present application.

FIG. 2A is a schematic diagram illustrating that the triangulation is utilized for Wi-Fi IPS according to the present application. In FIG. 2A, an AP1 device 21a and an AP2 device 21c are placed in an indoor environment 20 in advance. Later, a user holding the DUT 23 enters the indoor environment. The DUT 23 is a station device such as a mobile, a tablet, or a laptop.

A triangle is formed by the positions of the AP1 device 21a, the AP2 device 21c, and the DUT 23. In the specification, the side between the AP1 device 21a and the DUT 23 is represented by side SD1, the side between the AP2 device 21c and the DUT 23 is represented by side SD2, and the side between the AP1 device 21a and the AP2 device 21c is represented by side SD3. Besides, an internal angle formed between sides SD1, SD3 is represented as $\theta_{ap1}$ (first internal angle), and an internal angle formed between sides SD2, SD3 is represented as $\theta_{ap2}$ (second internal angle). The first internal angle $\theta_{ap1}$ corresponds to AP1 device 23a, and the second internal angle $\theta_{ap2}$ corresponds to AP2 device 23c.

The coordinate position of the AP1 device 21a is defined as a reference device coordinate $(X_{ap1}, Y_{ap1})$, and the coordinate position of the AP2 device 21c is defined as another reference device coordinate $(X_{ap2}, Y_{ap2})$. The reference device coordinates $(X_{ap1}, Y_{ap1})$, $(X_{ap2}, Y_{ap2})$ are predefined before the user holding the DUT 23 physically enters the indoor environment 20.

On the other hand, the coordinate position of the DUT 23 is represented by $(X_{DUT}, Y_{DUT})$. The coordinate of the DUT 23 is unknown and needs to be estimated based on the reference device coordinates $(X_{ap1}, Y_{ap1})$, $(X_{ap2}, Y_{ap2})$, the first internal angles $\theta_{ap1}$, and the second internal angle $\theta_{ap2}$.

According to the embodiment of the present disclosure, the reference device coordinates $(X_{ap1}, Y_{ap1})$, $(X_{ap2}, Y_{ap2})$ can be represented by absolute coordinates or relative coordinates. In the case that the absolute coordinate system is adopted, the absolute coordinates of the reference device $(X_{ap1}, Y_{ap1})$, $(X_{ap2}, Y_{ap2})$ are assumed to be GPS coordinates. In a case where the relative coordinate system is adopted, the AOA-triangulation-based Wi-Fi IPS can freely define the origin of coordinate, and the coordinate representation of the reference device coordinates $(X_{ap1}, Y_{ap1})$, $(X_{ap2}, Y_{ap2})$ is relatively flexible.

The descriptions of the embodiments below are based on the relative coordinate system. A similar concept can be modified and easily applied to the absolute coordinate system.

Figure 2B:
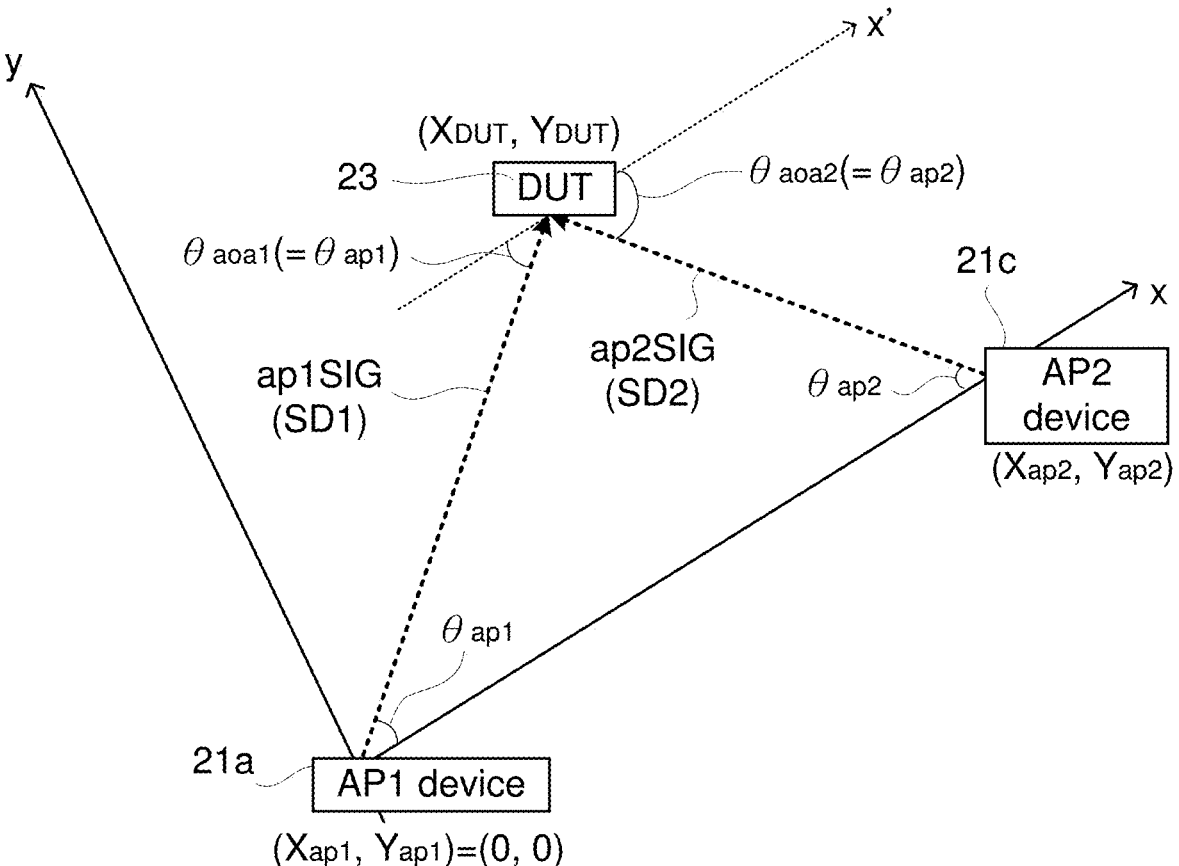
FIG. 2B is a schematic diagram illustrating that a relative coordinate system is adopted.

FIG. 2B is a schematic diagram illustrating that a relative coordinate system is adopted. In FIG. 2B, a relative coordinate system showing the positions of the AP1 device 21a, the AP2 device 21c, and the DUT 23 is shown. For the sake of illustration, the location of the AP1 device 21a can be considered as the origin of coordinates in a relative coordinate system (that is, $(X_{ap1}, Y_{ap1})=(0, 0)$).

In the Wi-Fi IPS, the positions of the AP1 device 21a, the AP2 device 21c, and the DUT 23 are represented in coordinate pairs, as listed in Table 1.

TABLE 1

| Wi-Fi device | relative coordinate system |
| --- | --- |
| AP1 device 21a | $(X_{ap1}, Y_{ap1}) = (0, 0)$ |
| AP2 device 21c | $(X_{ap2}, Y_{ap2}) = (X_{ap2}, 0)$ |
| DUT 23 | $(X_{DUT}, Y_{DUT})$ |

In FIG. 2B, the direction from the location of the AP1 device 21a to the location of the AP2 device 21c is defined as the relative x-axis of the relative coordinate system. The arrow passing the coordinate position of the AP1 device 21a with the direction perpendicular to the relative x-axis is defined as the relative y-axis (y). The dotted arrow passing the coordinate position $(X_{DUT}, Y_{DUT})$ of the DUT 23 with the direction parallel to the relative x-axis is defined as an offset relative x-axis (x').

The AP1 device 21a transmits the first Wi-Fi signal ap1SIG to the DUT 23, and the AP2 device 21c transmits the second Wi-Fi signal ap2SIG to the DUT 23. The transmission path of the first Wi-Fi signal ap1SIG is parallel to the side SD1, and the transmission path of the second Wi-Fi signal ap2SIG is parallel to the side SD2.

As shown in FIG. 2B, an angle of arrival $\theta_{aoa1}$ is formed by the side SD1 and the offset relative x-axis (x'), and an angle of arrival $\theta_{aoa2}$ is formed by the side SD2 and the offset relative x-axis (x'). As the relative x-axis (x) and the offset relative x-axis (x') are parallel and the angle of arrival $\theta_{aoa1}$ and the internal angle $\theta_{ap1}$ are alternate interior angles, the angle of arrival $\theta_{aoa1}$ is equivalent to the internal angle $\theta_{ap1}$. Similarly, the angle of arrival $\theta_{aoa2}$ is equivalent to the internal angle $\theta_{ap2}$.

According to the embodiment of the present disclosure, the DUT 23 is capable of calculating the angle of arrival $\theta_{aoa1}$ based on the first Wi-Fi signal ap1SIG, and calculating the angle of arrival $\theta_{aoa2}$ based on the second Wi-Fi signal ap2SIG. Once the first angle of arrival $\theta_{aoa1}$ and the second angle of arrival $\theta_{aoa2}$ are obtained, it implies that the internal angles $\theta_{ap1}$, $\theta_{ap2}$ are known. Then, an AOA-triangulation-based Wi-Fi IPS can be implemented by referring to the reference device coordinates $(X_{ap1}, Y_{ap1})$, $(X_{ap2}, Y_{ap2})$, the first angle of arrival $\theta_{aoa1}$, and the second angle of arrival $\theta_{aoa2}$.

The AOA-triangulation-based Wi-Fi IPS has high-accuracy and high-reliability indoor positioning functions. Depending on whether the AP device and the DUT are connected or not, the Wi-Fi signals being transmitted from the AP device to the DUT carry different types of packets. In practical applications, the types of packets carried by the Wi-Fi signals are not limited. In other words, the Wi-Fi signal can be utilized for calculating the angle of arrival $\theta_{aoa}$, regardless of the actual types of packets carried by a Wi-Fi signal apSIG. In the specification, the first Wi-Fi signal ap1SIG represents the Wi-Fi signal sent from the AP1 device 31a, and the second Wi-Fi signal ap2SIG represents the Wi-Fi signal sent from the AP2 device 31c.

Figure 3A:
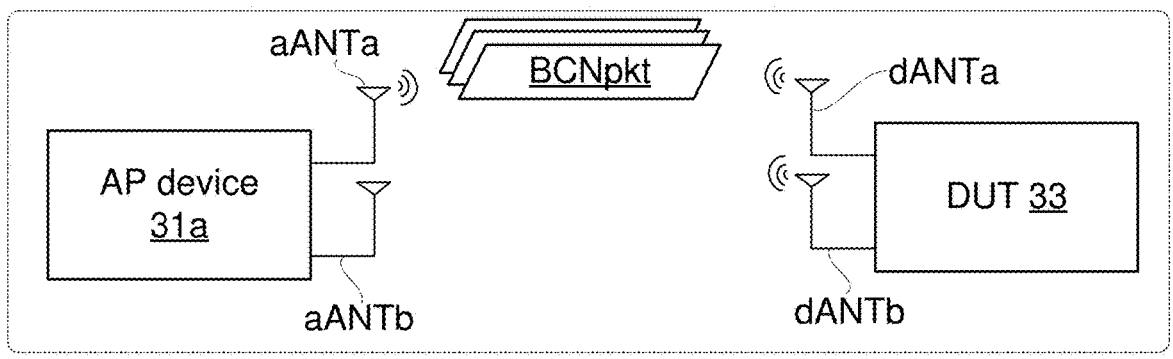
FIG. 3A is a schematic diagram illustrating that the AP device uses a single antenna aANTa to broadcast beacon packets BCNpkt.

When a DUT is not yet in communication with an AP device, the DUT utilizes the Wi-Fi signal carrying the beacon packets BCNpkt to detect the angle of arrival $\theta_{aoa}$. FIG. 3A is a schematic diagram illustrating that the AP device uses a single antenna aANTa to broadcast beacon packets BCNpkt. When the DUT 33 is not in communication with the AP device 31a, the AP device 31a uses only one antenna aANTa to transmit the beacon packets BCNpkt. Then, the antennas dANTa, dANTb of the DUT 33 could receive the beacon packets BCNpkt.

As the beacon packets BCNpkt is an existing scheme used in legacy Wi-Fi systems, and the triangulation calculation is performed by the DUT 33a, the AP device 31a does not need modifications if the DUT 33a uses the Wi-Fi signal carrying the beacon packets BCNpkt for positioning. This implies that the original designs of the legacy AP devices are compatible with the AOA-triangulation-based Wi-Fi IPS, according to the embodiment of the present disclosure.

Figure 3B:
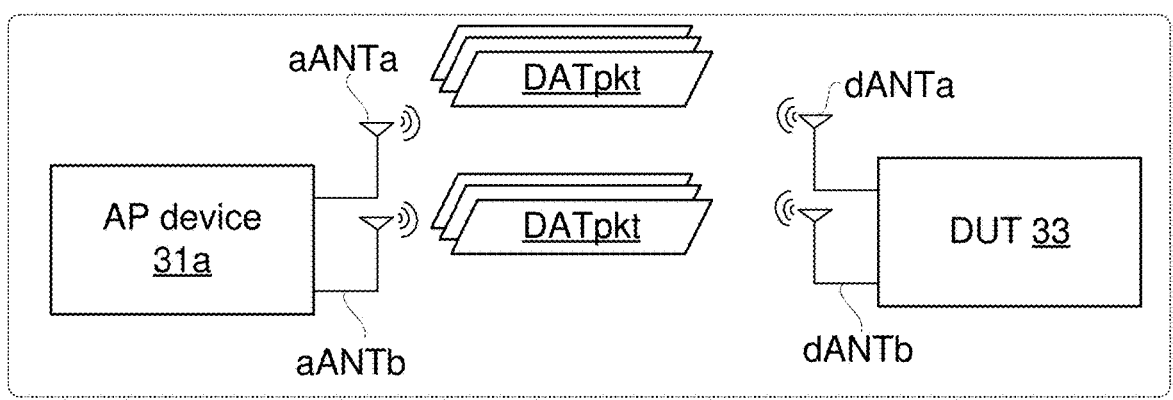
FIG. 3B is a schematic diagram illustrating that the AP device uses two antennas aANTa, aANTb to transmit data packets DATpkt to the DUT.

When a DUT 33 is in communication with the AP device 31*a*, the DUT 33 can utilize the Wi-Fi signal carrying the data packets DATpkt to detect the angle of arrival $\theta_{aoa}$. FIG. 3B is a schematic diagram illustrating that the AP device uses two antennas aANTa, aANTb to transmit data packets DATpkt to the DUT.

In a case that the DUT 33 utilizes the Wi-Fi signals carrying data packets DATpkt to calculate the angle of arrival $\theta_{aoa}$, the data packets DATpkt are simultaneously transmitted by at least two antennas aANTa, aANTb to ensure/enhance the data reliability. Under such circumstances, the internal design of the AP device 31*a* needs some modifications to support such a mechanism.

As illustrated in FIGS. 3A and 3B, either only the internal design of DUT or both the DUT and the AP device should be modified. If the DUT uses the Wi-Fi signal carrying beacon packets BCNpkt to calculate the angle of arrival $\theta_{aoa}$, only the internal design of the DUT should be modified (FIG. 3A). If the DUT uses the Wi-Fi signal carrying data packets DATpkt to calculate the angle of arrival $\theta_{aoa}$, both the internal designs of the DUT 33 and the AP device 31*a* should be modified (FIG. 3B). Details of the modification of the internal design of the DUT 33/the AP device 31*a* are omitted in the present disclosure.

Figure 4:
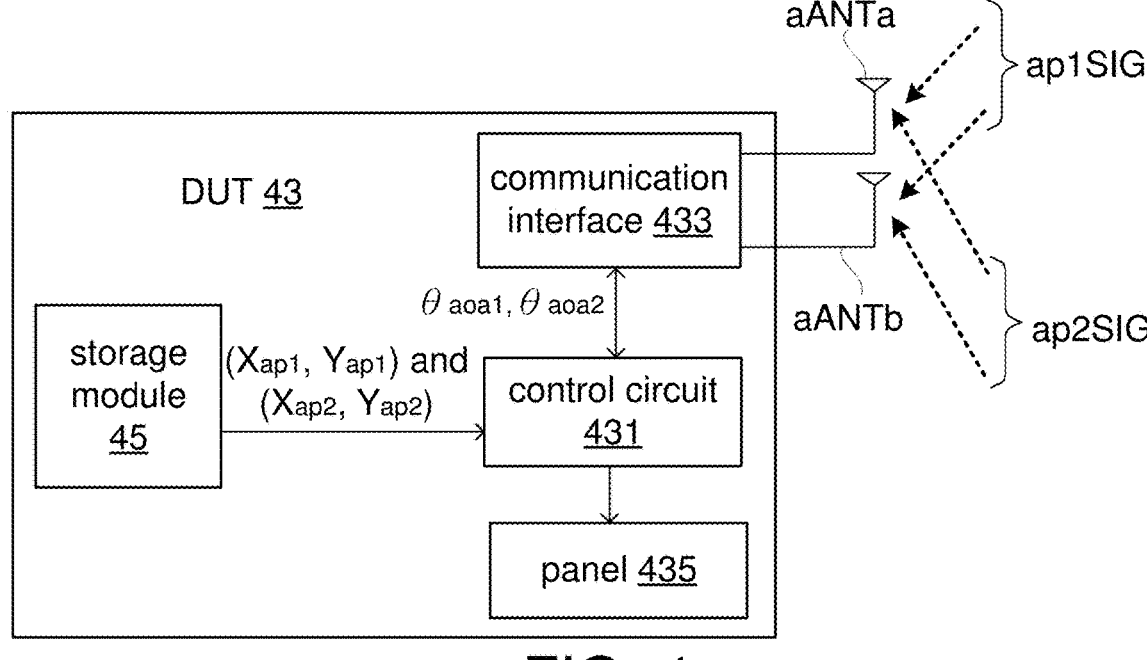
FIG. 4 is a schematic diagram illustrating that the DUT is the main device that estimates the target coordinate ($X_{DUT}$, $Y_{DUT}$) based on the first angle of arrival $\theta_{aoa1}$, the second angle of arrival $\theta_{aoa2}$ and the reference device coordinates ($X_{ap1}$, $Y_{ap1}$), ($X_{ap2}$, $Y_{ap2}$).
Figure 5:
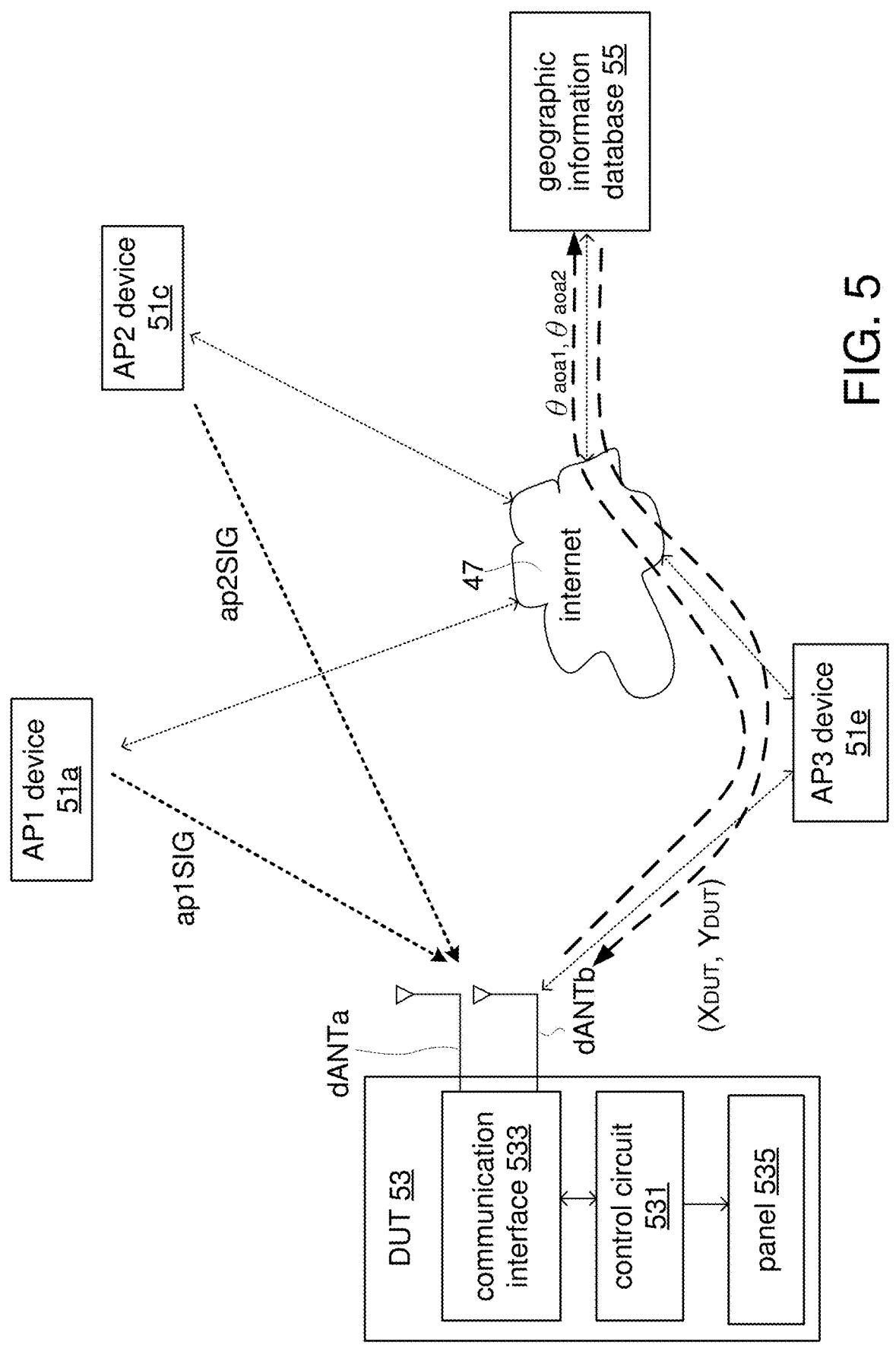
FIG. 5 is a schematic diagram illustrating that the geographic information database is the main device that estimates the target coordinate ($X_{DUT}$, $Y_{DUT}$) based on the first angle of arrival $\theta_{aoa1}$, the second angle of arrival $\theta_{aoa2}$, and the reference device coordinates ($X_{ap1}$, $Y_{ap1}$), ($X_{ap2}$, $Y_{ap2}$).

In practical applications, the device that estimates the target coordinate $(X_{DUT}, Y_{DUT})$ based on the first angle of arrival $\theta_{aoa1}$, the second angle of arrival $\theta_{aoa2}$, and the reference device coordinates $(X_{ap1}, Y_{ap1})$, $(X_{ap2}, Y_{ap2})$ is not limited. FIG. 4 is an example showing the DUT itself supports the calculation of estimating target coordinate $(X_{DUT}, Y_{DUT})$, and FIG. 5 is an example showing that the DUT transmits the first angle of arrival $\theta_{aoa1}$ and the second angle of arrival $\theta_{aoa2}$ to a remote server and the remote server performs the triangulation calculation.

FIG. 4 is a schematic diagram illustrating that the DUT is the main device that estimates the target coordinate $(X_{DUT}, Y_{DUT})$ based on the first angle of arrival $\theta_{aoa1}$, the second angle of arrival $\theta_{aoa2}$, and the reference device coordinates $(X_{ap1}, Y_{ap1})$, $(X_{ap2}, Y_{ap2})$.

The DUT 43 includes antennas aANTa, aANTb, a communication interface 433, a control circuit 431, a panel 435, and a storage module 45. The communication interface 433 is electrically connected to the antennas aANTa, aANTb, and the control circuit 431. The communication interface 433 includes a PHY module and a MAC module. The control circuit 431 is electrically connected to the panel 435 and the storage module 45.

The storage module 45 saves the reference device coordinate $(X_{ap1}, Y_{ap1})$ of the AP1 device and saves the reference device coordinate $(X_{ap2}, Y_{ap2})$ of the AP2 device. Moreover, the storage module 45 may provide some internal and pre-built geographic information (for example, a map) about the indoor environment.

The communication interface 433 calculates the first angle of arrival $\theta_{aoa1}$ and the second angle of arrival $\theta_{aoa2}$ based on the Wi-Fi signals ap1SIG, ap2SIG. The control circuit 431 receives the geographic information and the reference device coordinates $(X_{ap1}, Y_{ap1})$, $(X_{ap2}, Y_{ap2})$ from the storage module 45 and receives the first angle of arrival $\theta_{aoa1}$ and the second angle of arrival $\theta_{aoa2}$ from the communication interface 433. Then, the control circuit 431 performs the AOA-triangulation positioning. The panel 435 may display a map of the indoor environment, and the panel 435 shows the calculation result of the estimated target coordinate $(X_{DUT}, Y_{DUT})$ on the map. The visualized display of the estimated target coordinate $(X_{DUT}, Y_{DUT})$ on the map helps the user to identify his/her indoor position.

FIG. 5 is a schematic diagram illustrating that the geographic information database is the main device that estimates the target coordinate $(X_{DUT}, Y_{DUT})$ based on the first angle of arrival $\theta_{aoa1}$, the second angle of arrival $\theta_{aoa2}$, and the reference device coordinates $(X_{ap1}, Y_{ap1})$, $(X_{ap2}, Y_{ap2})$. In FIG. 5, it is assumed that the DUT 53, the AP1 device 51*a*, the AP2 device 51*c*, and the AP3 device 51*e* are in an indoor environment. Moreover, it is assumed that the DUT 53 is in communication with the AP3 device 51*e*, but the DUT 53 is not in communication with the AP1 device 51*a* and the AP2 device 51*c*.

As the AP1 device 51*a* and the AP2 device 51*c* are not in communication with the DUT 53, the AP1 device 51*a* simply uses one antenna to broadcast its beacon packets BCNpkt_AP1, and the AP2 device 51*c* simply broadcasts its beacon packets BCNpkt_AP2 with one antenna. The DUT 53 receives the beacon packets BCNpkt_AP1 through the first Wi-Fi signal ap1SIG, and the DUT 53 receives the beacon packets BCNpkt_AP2 through the second Wi-Fi signal ap2SIG.

On the other hand, the AP3 device 51*e* transmits data packets DATpkt_AP3 with two antennas. The use of two antennas can contribute to the data reliability between the AP3 device 51*e* and the DUT 53.

For the sake of illustration, it is assumed that the DUT 53 calculates the first/second angles of arrival $\theta_{aoa1}$, $\theta_{aoa2}$ based on the first/second Wi-Fi signals ap1SIG, ap2SIG in FIG. 5. Whereas, it is possible for the DUT 53 to calculate an angle of arrival $\theta_{aoa3}$ corresponding to the AP3 device 51*e* based on the data packets DATpkt_AP3. Similarly, the angle of arrival $\theta_{aoa3}$ can be collectively used with one or two of the first/second angles of arrival $\theta_{aoa1}$, $\theta_{aoa2}$ for estimating the target coordinate $(X_{DUT}, Y_{DUT})$. Details about the calculation of the angle of arrival $\theta_{aoa3}$ and how the angle of arrival $\theta_{aoa3}$ is utilized for positioning are omitted as these details can be conducted from the illustrations about the first/second angles of arrival $\theta_{aoa1}$, $\theta_{aoa2}$.

A geographic information database 55, the AP1 device 51*a*, the AP2 device 51*c*, and the AP3 device 51*e* are signally connected to the internet 47. The geographic information database 55 provides the geographic information, including the reference device coordinates $(X_{ap1}, Y_{ap1})$, $(X_{ap2}, Y_{ap2})$ corresponding to the AP1 device 51*a* and the AP2 device 51*c*. As the DUT 53 is in communication with the AP3 device 51*e*, the DUT 53 is capable of interchanging information with the geographic information database 55 through the AP3 device 51*e* and the internet 47.

Once the DUT 53 transmits the first/second angles of arrival $\theta_{aoa1}$, $\theta_{aoa2}$ to the geographic information database 55 through the AP3 device 51*e* and the internet 48, the geographic information database 55 is capable of estimating the target coordinate $(X_{DUT}, Y_{DUT})$ based on the first/second angles of arrival $\theta_{aoa1}$, $\theta_{aoa2}$ and the reference device coordinates $(X_{ap1}, Y_{ap1})$, $(X_{ap2}, Y_{ap2})$. Then, the geographic information database 55 transmits the calculation result of the estimated target coordinate $(X_{DUT}, Y_{DUT})$ to the internet 47, and the AP3 device 51*e* passes the estimated target coordinate $(X_{DUT}, Y_{DUT})$ to the DUT 53.

The DUT 53 includes antennas dANTa, dANTb, a communication interface 533, a control circuit 531, and a panel 535. The communication interface 533 is electrically connected to the antennas dANTa, dANTb, and the control circuit 531. The control circuit 531 is electrically connected to the panel 535.

The antenna dANTa receives the first Wi-Fi signal ap1SIG from the AP1 device 51*a* and receives the second Wi-Fi signal ap2SIG from the AP2 device 51*c*. The antenna dANTb receives the first Wi-Fi signal ap1SIG from the AP1 device 51a and receives the second Wi-Fi signal ap2SIG from the AP2 device 51c. According to the embodiment of the present disclosure, the first Wi-Fi signal ap1SIG received by the antennas dANTa, dANTb can be utilized to calculate the angle of arrival $\theta_{aoa1}$ corresponding to the AP1 device 51a, and the second Wi-Fi signal ap2SIG received by the antennas dANTa, dANTb can be utilized to calculate the angle of arrival $\theta_{aoa2}$ corresponding to the AP2 device 51c.

The control circuit 531 controls the communication interface 533 to calculate the first angle of arrival $\theta_{aoa1}$ and the second angle of arrival $\theta_{aoa2}$, and the control circuit 531 receives the estimated target coordinate $(X_{DUT}, Y_{DUT})$ via the antennas dANTa, dANTb, and the communication interface 533. Then, the control circuit 531 controls the panel 535 to display a map of the indoor environment, and the panel 535 shows the estimated target coordinate $(X_{DUT}, Y_{DUT})$ on the map. The visualized display of the estimated target coordinate $(X_{DUT}, Y_{DUT})$ helps the user to identify his/her indoor position.

In short, as the geographic information is integrated into the storage module of DUT 43 in FIG. 4, the DUT 43 in FIG. 4 can directly determine the estimated target coordinate $(X_{DUT}, Y_{DUT})$ based on the first/second angles of arrival $\theta_{aoa1}$, $\theta_{aoa2}$ and the reference device coordinates $(X_{ap1}, Y_{ap1})$, $(X_{ap2}, Y_{ap2})$. In contrast, the geographic information is remotely provided by a geographic information database 55. Thus, the DUT 53 in FIG. 5 needs to connect to the internet to transmit the first angle of arrival $\theta_{aoa1}$ and the second angle of arrival $\theta_{aoa2}$ to the geographic information database 55, and the geographic information database 55 becomes the main device that estimates the target coordinate $(X_{DUT}, Y_{DUT})$ based on the first angle of arrival $\theta_{aoa1}$ and the second angle of arrival $\theta_{aoa2}$ and the reference device coordinates $(X_{ap1}, Y_{ap1})$, $(X_{ap2}, Y_{ap2})$. In practical applications, the source/provider of the geographic information is not limited.

Figure 6:
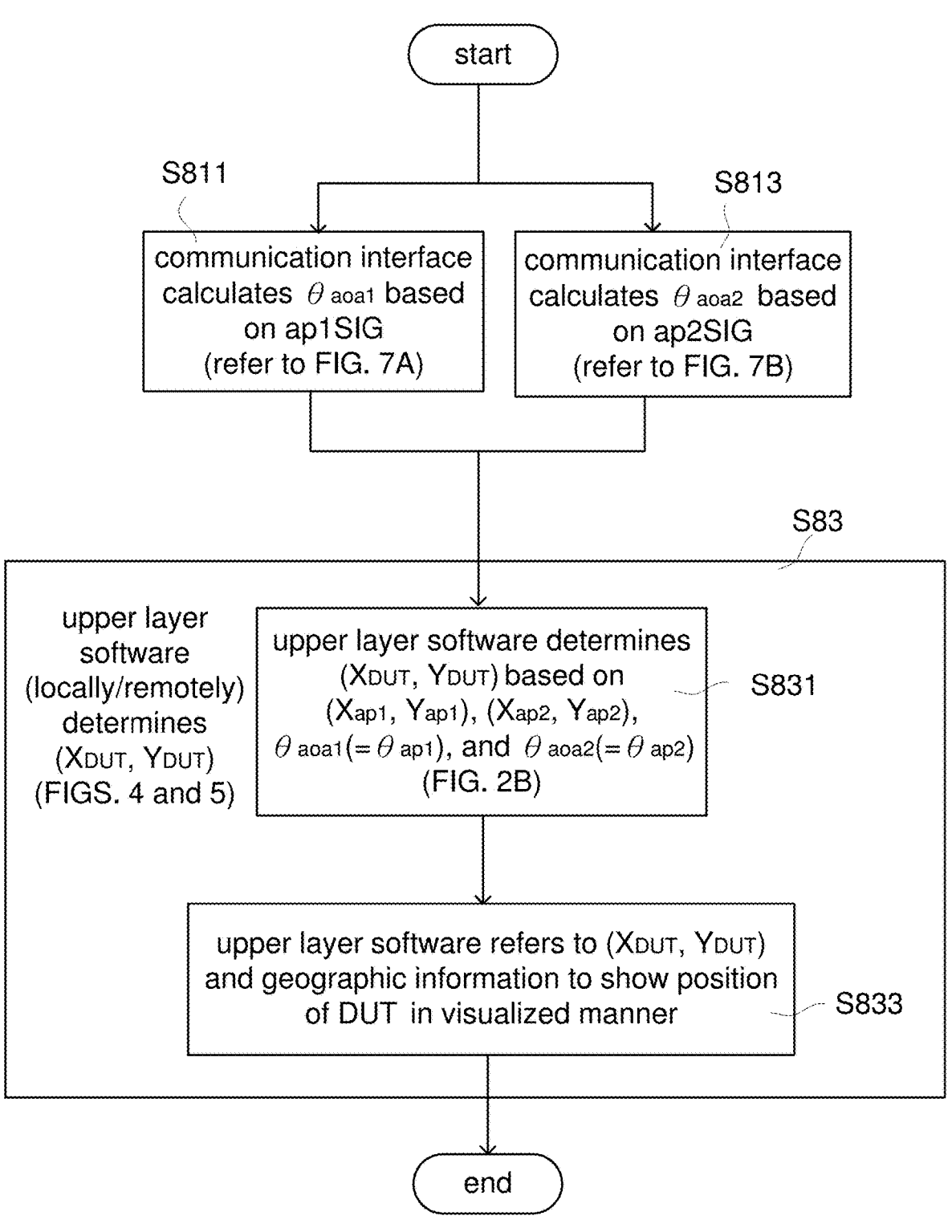
FIG. 6 is a flow diagram illustrating how the target coordinate ($X_{DUT}$, $Y_{DUT}$) is estimated based on the first angle of arrival $\theta_{aoa1}$ and the second angle of arrival $\theta_{aoa2}$.

FIG. 6 is a flow diagram illustrating how the target coordinate $(X_{DUT}, Y_{DUT})$ is estimated based on the first/second angles of arrival $\theta_{aoa1}$, $\theta_{aoa2}$. The communication interface 433, 533 calculates the first angle of arrival $\theta_{aoa1}$ based on the first Wi-Fi signal ap1SIG (step 811), and the communication interface 433, 533 calculates the second angle of arrival $\theta_{aoa2}$ based on the second Wi-Fi signal ap2SIG (step 813). More explanations about steps 811, 813 may refer to FIGS. 7A and 7B.

After the angle of arrival $\theta_{aoa1}$, $\theta_{aoa2}$ are calculated, an upper layer software is executed to estimate the target coordinate $(X_{DUT}, Y_{DUT})$ (step S83). The upper layer software can be locally performed by the DUT (for example, the control circuit 431 in FIG. 4) or remotely performed by a cloud server (for example, the geographic information database 55 in FIG. 5).

The upper layer software estimates the target coordinate $(X_{DUT}, Y_{DUT})$ based on the reference device coordinates $(X_{ap1}, Y_{ap1})$, $(X_{ap2}, Y_{ap2})$, the first angle of arrival $\theta_{aoa1}$ $(=\theta_{ap1})$, and the second angle of arrival $\theta_{aoa2}(=\theta_{ap2})$ (step S831). Then, the upper layer software refers to the estimated target coordinate $(X_{DUT}, Y_{DUT})$ and the geographic information (for example, a map) to show the coordinate position $(X_{DUT}, Y_{DUT})$ of the DUT 23 in a visualized manner (step S833).

Figure 7A:
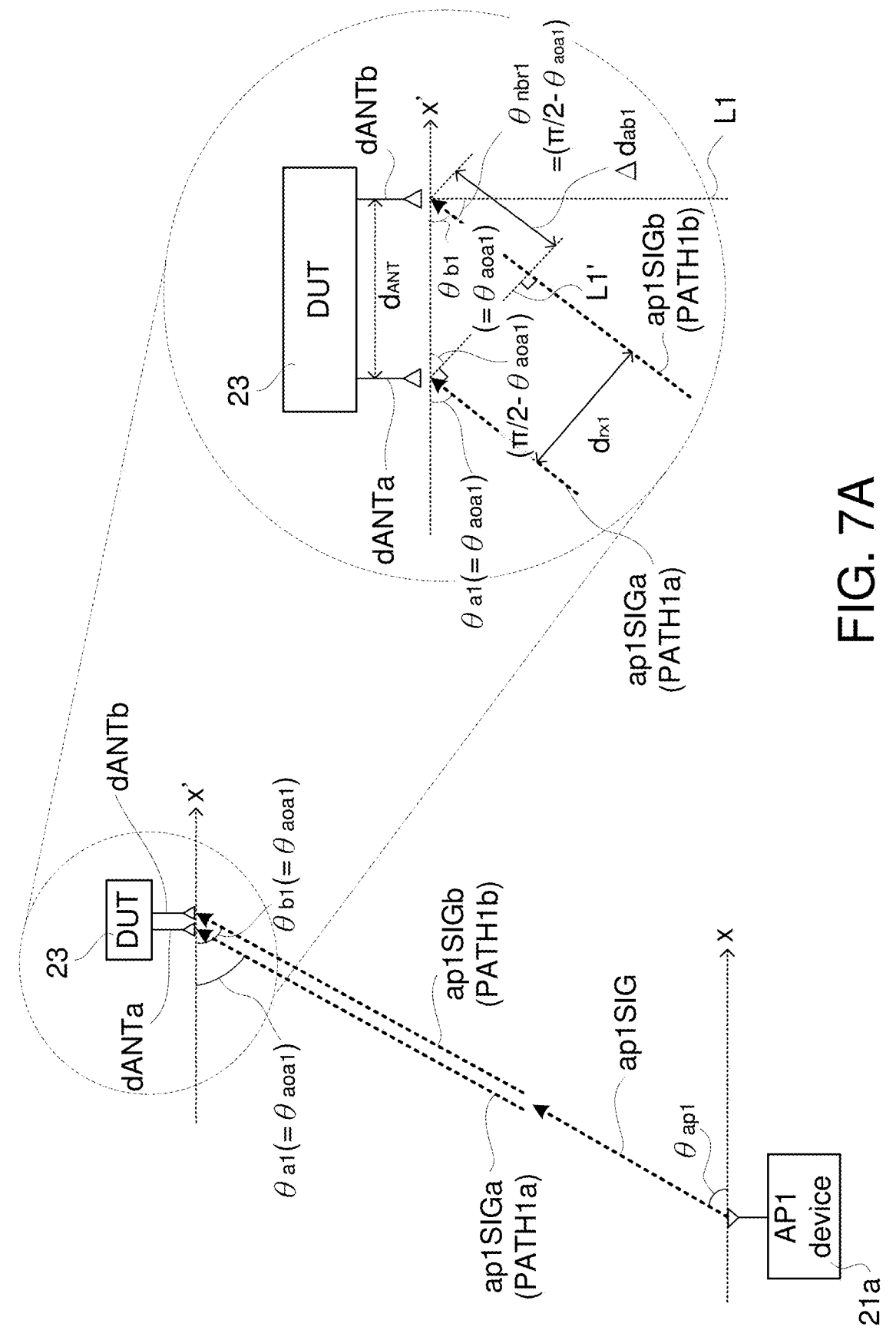
FIG. 7A is a schematic diagram illustrating how the DUT having two antennas dANTa, dANTb calculates the first angle of arrival $\theta_{aoa1}$.

FIG. 7A is a schematic diagram illustrating how the DUT having two antennas dANTa, dANTb calculates the first angle of arrival $\theta_{aoa1}$. On the left side of FIG. 7A, the transmission path of the Wi-Fi signal sent from the AP1 device 21a to the DUT 23 is shown. On the right side of FIG. 7A, the incident angles of the first Wi-Fi signal ap1SIG received by the antennas dANTa, dANTb are shown.

For the sake of illustration, it is assumed that the DUT 23 has two antennas dANTa, dANTb. Both the antennas dANTa, dANTb receive the first Wi-Fi signal ap1SIG sent from the AP1 device 21a. In practical applications, the DUT 23 may have a different number of antennas, and the actual layout of the antennas is not limited.

Please refer to the right side of FIG. 7A. The plane where the antennas dANTa, dANTb are placed can be considered as a tangent plane, and the distance between the antennas dANTa, dANTb is defined as a separation distance $d_{ANT}$. In the specification, the Wi-Fi signal sent from the AP1 device 21a and received by the antenna dANTa is defined as a first-first Wi-Fi signal ap1SIGa, and the Wi-Fi signal sent from the AP1 device 21a and received by the antenna dANTb is defined as a first-second Wi-Fi signal ap1SIGb.

The separation distance $d_{ANT}$ is shorter than or equivalent to half of the wavelength of the Wi-Fi signal sent from the AP1 device 21a $(d_{ANT}\leq\lambda/2)$. For example, assuming the frequency of the Wi-Fi signal sent from the AP1 device 21a is 2.4 GHz (f=2.4 GHz), the wavelength $\lambda$ is equivalent to 0.125 m ($\lambda\approx0.125$ m), and the separation distance $d_{ANT}$ is shorter than or equivalent to 0.625 m $(d_{ANT}\leq\lambda/2=0.0625$ m).

In comparison with the separation distance $d_{ANT}$, the distance between the DUT 23 and the AP1 device 21a is relatively far away. Thus, the first-first transmission path PATH1a of the first-first Wi-Fi signal ap1SIGa and the first-second transmission path PATH1b of the first-second Wi-Fi signal ap1SIGb can be considered parallel. Accordingly, the incident angle $\theta_{a1}$ of the first-first Wi-Fi signal ap1SIGa is equivalent to the incident angle $\theta_{b1}$ of the first-second Wi-Fi signal ap1SIGb. Both the incident angles $\theta_{a1}$, $\theta_{b1}$ are equivalent to the first angle of arrival $\theta_{aoa1}$.

On the right side of FIG. 7A, a dotted line L1 is extended from the antenna dANTb. The dotted line L1 is a normal line perpendicular to the offset relative x-axis (x'). The angle between the Wi-Fi signal received by the antenna dANTb and the dotted line L1 is defined as a neighboring angle $\theta_{nbr1}$. The neighboring angle $\theta_{nbr1}$ is equivalent to $(\pi/2-\theta_{aoa1})$. That, $\theta_{nbr1}=(\pi/2-\theta_{aoa1})$.

As the physical layout positions of the antenna dANTa, dANTb are not completely identical, there is a first path difference $\Delta d_{ab1}$ between the first-first transmission path PATH1a of the first-first Wi-Fi signal ap1SIGa and the first-second transmission path PATH1b of the first-second Wi-Fi signal ap1SIGb. The first path difference $\Delta d_{ab1}$ can be estimated by calculating a first phase difference $(\Delta\psi_{ab1}=\psi_{a1}-\psi_{b1})$ and/or a first arrival time difference $(\Delta t_{ab1}=(t_{a1}-t_{b1}))$ between the first-first Wi-Fi signal ap1SIGa and the first-second Wi-Fi signal ap1SIGb received by the antennas dANTa, dANTb.

The first path difference $\Delta d_{ab1}$ can be calculated based on different types of parameters. For example, a first phase difference $(\Delta\psi_{ab1}=\psi_{a1}-\psi_{b1})$ representing a phase difference between the first-first Wi-Fi signal ap1SIGa and the first-second Wi-Fi signal ap1SIGb can be utilized to estimate the first path difference $\Delta d_{ab1}$ (see Table 5). Alternatively, the first arrival time difference $(\Delta t_{ab1}=(t_{a1}-t_{b1}))$ between the first-first Wi-Fi signal ap1SIGa and the first-second Wi-Fi signal ap1SIGb can be utilized to estimate the first path difference $\Delta d_{ab1}$ (see Table 4). Once the first path difference $\Delta d_{ab1}$ is known, the first angle of arrival $\theta_{aoa1}$ can be calculated accordingly.

In FIG. 7A, it is assumed that the first-first transmission path PATH1a is slightly shorter than the first-second transmission path PATH1b, and the arrival time point $(t_{a1})$ of the first-first Wi-Fi signal ap1SIGa is slightly earlier than the arrival time point ($t_{b1}$) of the first-second Wi-Fi signal ap1SIGb.

Based on the arrival time points $t_{a1}$, $t_{b1}$, the first arrival time difference $\Delta t_{ab1}$ can then be calculated by $\Delta t_{ab1} = (t_{a1} - t_{b1})$. Moreover, the first path difference $\Delta d_{ab1}$ between the transmission path PATH1a of the first-first Wi-Fi signal ap1SIGa and the transmission path PATH1b of the first-second Wi-Fi signal ap1SIGb can be calculated based on the first arrival time difference $\Delta t_{ab}$ and the speed of light c. That is, $\Delta d_{ab1} = c * \Delta t_{ab1}$.

The arrival time point $t_{a1}$ of the first-first Wi-Fi signal ap1SIGa affects how the communication interface 433, 533 determines the phase of the first-first Wi-Fi signal ap1SIGa. That is, the first-first phase $\psi_{a1}$. The arrival time point $t_{b1}$ of the first-second Wi-Fi signal ap1SIGb affects how the communication interface 433, 533 determines the phase of the first-second Wi-Fi signal ap1SIGb. That is, the first-second phase $\psi_{b1}$.

A right triangle is formed by the offset relative x-axis (x'), the first path difference $\Delta d_{ab1}$, and the transmission path (PATH1b) of the first-second Wi-Fi signal ap1SIGb, and a dotted line L1' having a length equivalent to the parallel signal distance $d_{rx}$. The parallel signal distance $d_{rx}$ represents the parallel distance between the transmission path PATH1a and the transmission path PATH1b.

As the summation of the internal angles of any triangle is equivalent to $\pi/2$, it can be concluded that the internal angles of the right triangle are respectively equivalent to $\pi/2$, $\theta_{aoa1}$, and $(\pi/2 - \theta_{aoa1})$. With the side lengths of the right triangle ($\Delta d_{ab1}$, $d_{ANT}$), the sine function of the right triangle can be represented by sin $$\sin\left(\frac{\pi}{2} - \theta_{aoa1}\right) = \frac{\Delta d_{ab1}}{d_{ANT}}.$$

Accordingly, the exact degree of the first angle of arrival $\theta_{aoa1}$ can be calculated based on the equation of the inverse trigonometric function of the sine function. That is, $$\theta_{aoa1} = \frac{\pi}{2} - \sin^{-1}\left(\frac{\Delta d_{ab1}}{d_{ANT}}\right).$$

As illustrated in FIG. 2B, the first angle of arrival $\theta_{aoa1}$ and the internal angle $\theta_{ap1}$ are equivalent because they are alternate interior angles. In other words, once the first angle of arrival $\theta_{aoa1}$ is known, the first internal angle $\theta_{ap1}$ is known. Accordingly, the right triangle in FIG. 7A can be referred to calculate the internal angle $\theta_{ap1}$ in FIG. 2B.

Figure 7B:
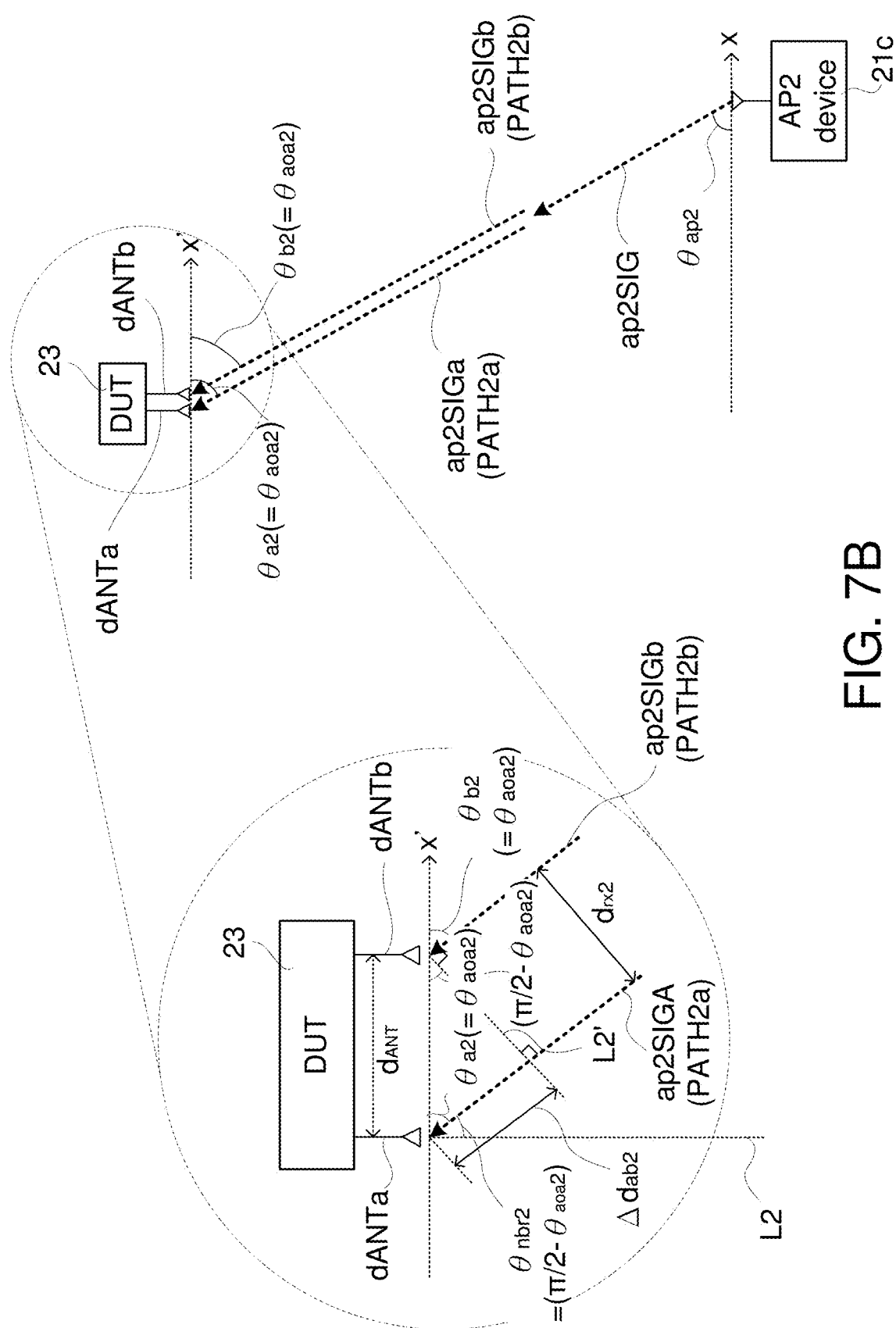
FIG. 7B is a schematic diagram illustrating how the DUT having two antennas dANTa, dANTb calculates the second angle of arrival $\theta_{aoa2}$.

FIG. 7B is a schematic diagram illustrating how the DUT having two antennas dANTa, dANTb calculates the second angle of arrival $\theta_{aoa2}$. The calculation of the internal angle $\theta_{ap2}$ in FIG. 2B can be obtained by calculating the second angle of arrival $\theta_{aoa1}$ in FIG. 7B, and the calculation of the second angle of arrival $\theta_{aoa2}$ is analog to the calculation of the first angle of arrival $\theta_{aoa1}$, and. Detailed illustrations about FIG. 7B are omitted as the calculation, symbols, and expressions in FIG. 7B can be analog to those in FIG. 7A.

Please refer to Table 2 for the parameters' correspondences in FIGS. 7A and 7B. For the sake of illustration, the parameters related to the calculation of the estimated target coordinate ($X_{DUT}$, $Y_{DUT}$) are summarized in Table 2. Please refer to FIGS. 2B, 7A, and 7B and Table 2 together.

TABLE 2

| Drawings | FIG. 7A | | FIG. 7B | |
|---|---|---|---|---|
| reference devices | AP1 device 21a | | AP2 device 21c | |
| reference device coordinates | $(X_{ap1}, Y_{ap1})$ | | $(X_{ap2}, Y_{ap2})$ | |
| internal angles | first internal angle $\theta_{ap1}$ = first angle of arrival $\theta_{aoa1}$ | | second internal angle $\theta_{ap2}$ = second angle of arrival $\theta_{aoa2}$ | |
| antennas | first antenna dANTa | second antenna dANTb | first antenna dANTa | second antenna dANTb |
| received Wi-Fi signals | first-first Wi-Fi signal ap1SIGa | first-second Wi-Fi signal ap1SIGb | second-first Wi-Fi signal ap2SIGa | second-second Wi-Fi signal ap2SIGb |
| transmission paths | first-first transmission path PATH1a | first-second transmission path PATH1b | second-first transmission path PATH2a | second-second transmission path PATH2b |
| path differences | first path difference $\Delta d_{ab1}$ = difference between length of PATH1a and length of PATH1b | | second path difference $\Delta d_{ab2}$ = difference between length of PATH2a and length of PATH2b | |

For the sake of illustration, the calculation of the first path difference $\Delta d_{ab1}$ is assumed to be performed based on the first arrival time difference $\Delta t_{ab1}$ between arrival time points $t_{a1}$, $t_{b1}$, and the calculation of the second path difference $\Delta d_{ab2}$ is assumed to be performed based on the second arrival time difference $\Delta t_{ab2}$ between arrival time points $t_{a2}$, $t_{b2}$. That is, $\Delta t_{ab1}=(t_{a1}-t_{b1})$ and $\Delta t_{ab2}=(t_{a2}-t_{b2})$.

In practical applications, the first path difference $\Delta d_{ab1}$ can also be calculated based on the first phase difference $(\Delta\psi_{ab1}=\psi_{a1}-\psi_{b1})$, that is, the phase difference between the first-first phase $\psi_{a1}$ corresponding to the first-first Wi-Fi signal ap1SIGa and the first-second phase $\psi_{b1}$ corresponding to the first-second Wi-Fi signal ap1SIGb. Similarly, the second path difference $\Delta d_{ab2}$ can be calculated based on the second phase difference $(\Delta\psi_{ab2}=\psi_{a2}-\psi_{b2})$, that is, the phase difference between the second-first phase $\psi_{a2}$ corresponding to the second-first Wi-Fi signal ap2SIGa and the second-second phase $\psi_{b2}$ corresponding to the second-second Wi-Fi ap1S2Gb. With the separation distance $d_{ANT}$, the first path difference $\Delta d_{ab1}$ and the second phase difference $(\Delta\psi_{ab2}=\psi_{a2}-\psi_{b2})$ are respectively utilized to calculate the first angle of arrival $\theta_{aoa1}$ and the second angle of arrival $\theta_{aoa2}$. Later, the coordinate position of the DUT $(X_{DUT}, Y_{DUT})$ is estimated by performing AOA-triangulation calculation to the first angle of arrival $\theta_{aoa1}$ (=internal angle $\theta_{ap1}$), the second angle of arrival $\theta_{aoa2}$ (=internal angle $\theta_{ap2}$), and the reference device coordinates $(X_{ap1}, Y_{ap1})$, $(X_{ap2}, Y_{ap2})$.

Figure 8:
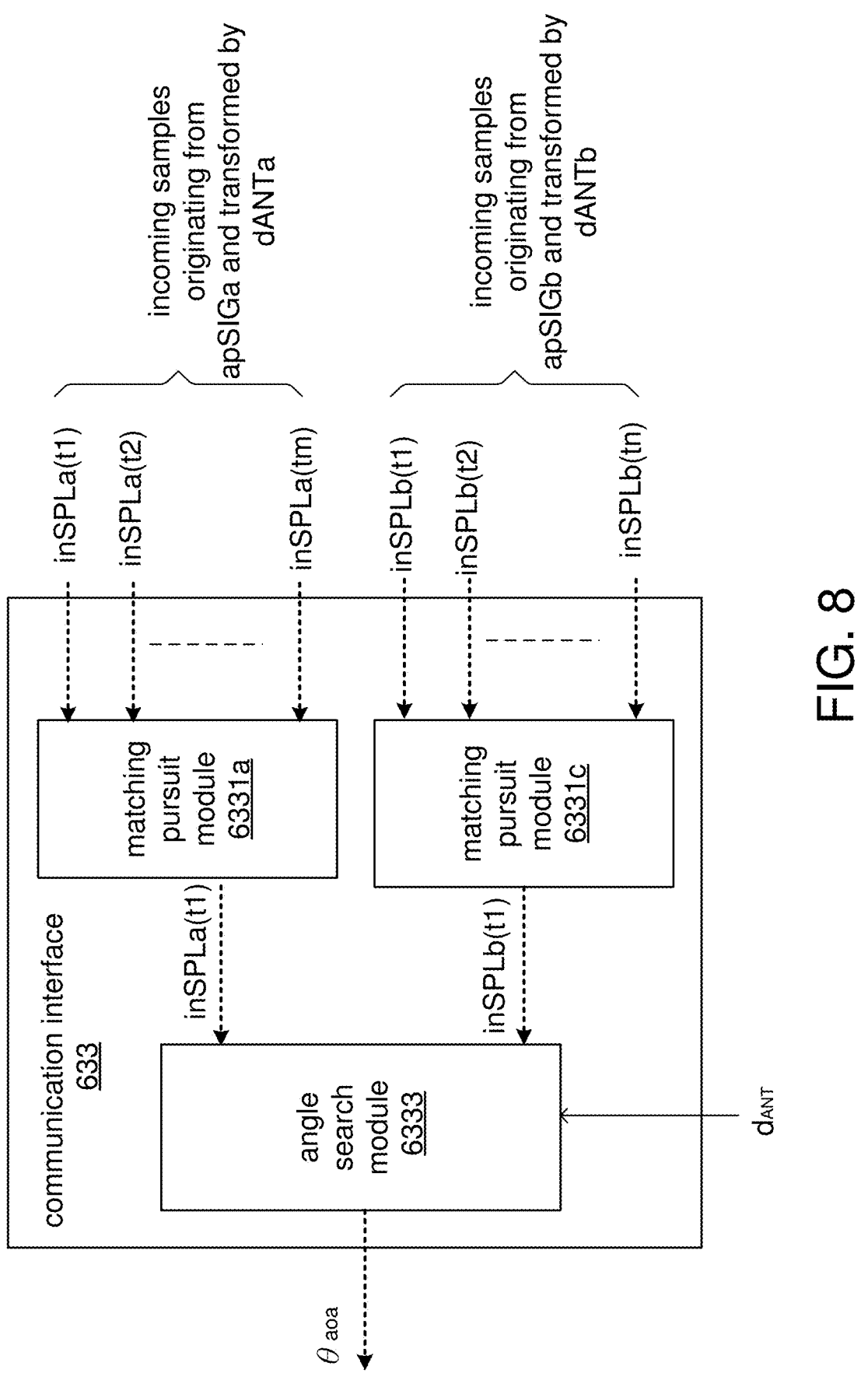
FIG. 8 is a block diagram schematically illustrating the signal transformation procedure of the communication interface.

FIG. 8 is a block diagram schematically illustrating the signal transformation procedure of the communication interface. The illustrations about the exemplary Wi-Fi signal apSIG in FIG. 8 can be applied to any of the first Wi-Fi signal ap1SIG and the second Wi-Fi signal ap2SIG.

The communication interface 633 includes matching pursuit modules 6331a, 6331c and an angle search module 6333. The matching pursuit module 6331a is electrically connected to the antenna dANTa and the angle search module 6333, and the matching pursuit module 6331c is electrically connected to the antenna dANTb and the angle search module 6333.

In an indoor environment, the Wi-Fi signal apSIG may directly or indirectly transmit to the antennas dANTa, dANTb, and the same Wi-Fi signal originating from an AP device and received by the same antenna of the DUT might be accompanied by several incoming samples. For example, an incoming sample corresponding to a direct transmission path (directly transmitted from the AP device to the DUT 23) has a shorter transmission duration. On the other hand, an incoming sample corresponding to an indirect transmission path (for example, the Wi-Fi signal reflected by the surfaces of the furniture) has a longer transmission duration. Consequentially, the time points that the antennas dANTa, dANTb respectively generate the incoming samples are not synchronized because there are different transmission paths in the indoor environment, and the interferences/distortion in the indoor environment may vary with the transmission paths.

In FIG. 8, the incoming samples inSPLa(t1)~inSPLa(tm) represent the incoming samples generated by the antenna dANTa, and the incoming samples inSPLb(t1)~inSPLb(tn) represent the incoming samples generated by the antenna dANTb. The source of the incoming samples inSPLa(t1)~inSPLa(tm) can be the first-first Wi-Fi signal ap1SIGa or the second-first Wi-Fi signal ap2SIGa, and the source of the incoming samples inSPLb(t1)~inSPLb(tn) can be the first-second Wi-Fi signal ap1SIGb or the second-second Wi-Fi signal ap2SIGb.

In the specification, the variable "m" represents the number of incoming samples generated by the antenna dANTa, and the variable "n" represents the number of incoming samples generated by the antenna dANTb. That is, the antenna dANTa receives and transforms the Wi-Fi signal apSIG to "m" incoming samples inSPLa(t1)~inSPLa(tm) at "m" different time points (t1~tm), and the antenna dANTb receives and transforms the Wi-Fi signal apSIG to "n" incoming samples inSPLb(t1)~inSPLb(tn) at "n" different time points (t1~tn). The variables m and n are positive integers, and the variables m and n might or might not be equivalent.

The matching pursuit module 6331a is electrically connected to the antenna dANTa and the angle search module 6333, and the matching pursuit module 6331c is electrically connected to the antenna dANTb and the angle search module 6333. The matching pursuit module 6331a receives the m incoming samples inSPLa(t1)~inSPLa(tm) from the antenna dANTa, and the matching pursuit module 6331c receives the n incoming samples inSPLb(t1)~inSPL(tn) from the antenna dATNb.

The m incoming samples inSPLa(t1)~inSPLa(tm) are chronologically generated, and the matching pursuit module 6331a finds one of the m incoming samples inSPLa(t1)~inSPLa(tm) having the maximum peak (for example, inSPLa(t1)). For example, the receiving time point of the maximum peak (inSPLa(t1)) among the m incoming samples inSPLa(t1)~inSPLa(tm) is defined as the valid arrival time point $t_{a1}$ corresponding to the Wi-Fi signal apSIGa received by the antenna dANTa.

The n incoming samples inSPLb(t1)~inSPL(tn) are chronologically generated, and the matching pursuit module 6331a finds one of the n incoming samples inSPLb(t1)~inSPLa(tn) having the maximum peak (for example, inSPLb(t1)). For example, the receiving time point of the maximum peak (inSPLb(t1)) among the n incoming samples inSPLb(t1)~inSPLb(tn) is defined as the valid arrival time point $t_{b1}$ corresponding to the Wi-Fi signal apSIGb received by the antenna dANTb.

The angle search module 6333 then performs Bartlett search to compensate for the phase difference in the transmission paths of the Wi-Fi signals apSIGa, apSIGb. Moreover, the angle search module 6333 magnifies the incoming samples having the maximum peaks (inSPLa(t1), inSPLb(t1)). After magnification, the valid arrival time points $t_{a1}$, $t_{b1}$ are defined, and the arrival time difference $\Delta t_{ab}=(t_{a1}-t_{b1})$ is acquired. According to the embodiment of the present disclosure, once the arrival time difference $\Delta t_{ab}=(t_{a1}-t_{b1})$ is known, the angle of arrival $\theta_{aoa}$ can be calculated based on the arrival time difference $\Delta t_{ab}$, the speed of light c, and the separation distance $d_{ANT}$.

Figure 9:
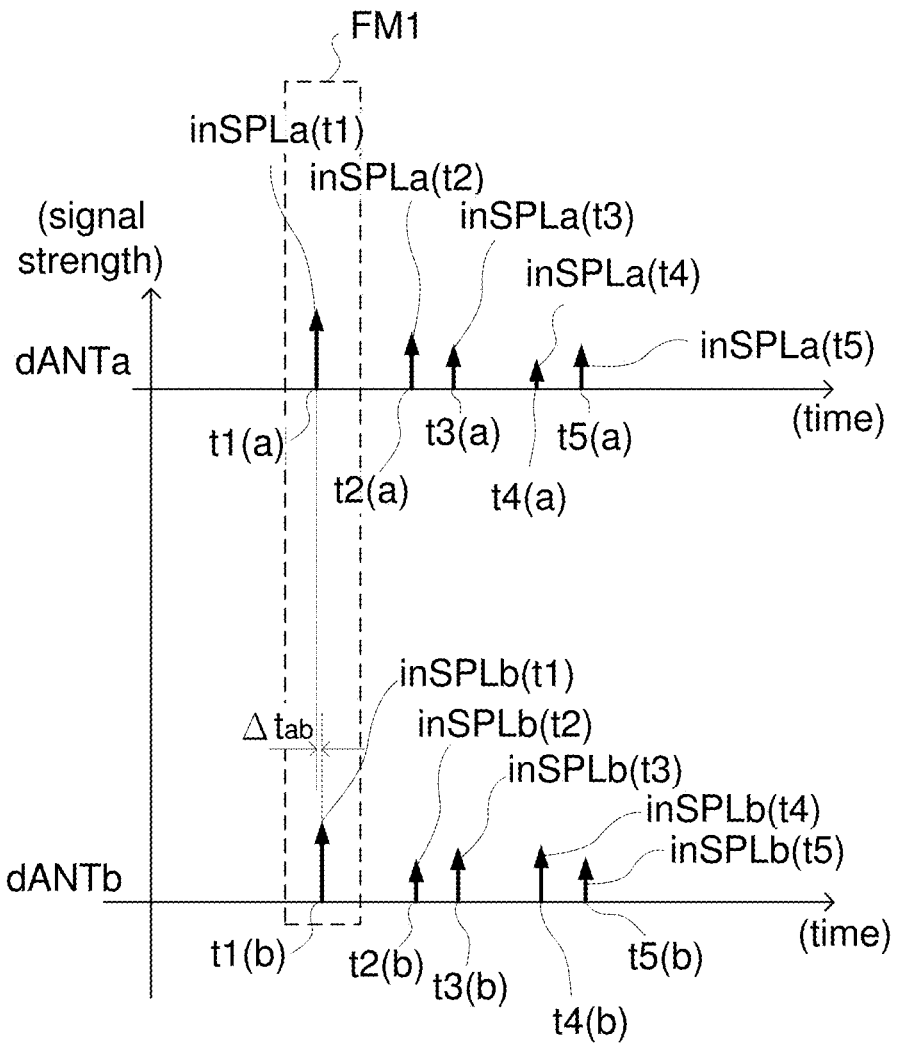
FIG. 9 is a schematic diagram illustrating that the antenna dANTa receives a sequence of incoming samples {inSPLa (t1), inSPLa(t2), inSPLa(t3), inSPLa(t4), inSPLa(t5)} caused by the Wi-Fi signal apSIG and the antenna dANTb receives another sequence of incoming samples {inSPLb (t1), inSPLb(t2), inSPLb(t3), inSPLb(t4), inSPLb(t5)} caused by the Wi-Fi signal apSIG.

FIG. 9 is a schematic diagram illustrating that the antenna dANTa receives a sequence of incoming samples {inSPLa(t1), inSPLa(t2), inSPLa(t3), inSPLa(t4), inSPLa(t5)} caused by the Wi-Fi signal apSIG and the antenna dANTb receives another sequence of incoming samples {inSPLb(t1), inSPLb(t2), inSPLb(t3), inSPLb(t4), inSPLb(t5)} caused by the Wi-Fi signal apSIG. In FIG. 9, it is assumed that, in response to the Wi-Fi signal apSIG, the antenna dANTa receives m=5 incoming samples inSPLa(t1), inSPLa(t2), inSPLa(t3), inSPLa(t4), inSPLa(t5), and the antenna dANTb receives n=5 incoming samples inSPLb(t1), inSPLb(t2), inSPLb(t3), inSPLb(t4), inSPLb(t5).

In FIG. 9, the vertical axis represents the signal strength, and the two horizontal axes represent timing. The upper timing axis corresponds to the sequence of incoming samples caused by the Wi-Fi signal ap1SIG and received by the antenna dANTa, and the lower timing axis corresponds to the sequence of incoming samples caused by the Wi-Fi signal ap1SIG and received by the antenna dANTb.

The incoming samples inSPLa(t1)~inSPLa(t5) received by the antenna dANTa have different signal strengths, and the incoming sample inSPLa(t1) is one of the incoming samples received by the antenna dANTa having the maximum peak. The incoming samples inSPLb(t1)~inSPLb(t5) received by the antenna dANTb have different signal strengths, and the incoming sample inSPLb(t1) is one of the incoming samples received by the antenna dANTb having the maximum peak.

In FIG. 9, the incoming samples circulated by the dotted frame FM1 are the incoming signals received earliest by the antennas dANTa, dANTb and have the maximum peaks. The angle search module 6333 recognizes the incoming sample inSPLa(t1) as the Wi-Fi signal sent by the AP device 21$a$ and received by the antenna dANTa, and the angle search module 6333 recognizes the incoming sample inSPLb(t1) as the Wi-Fi signal sent by the AP device 21$a$ and received by the antenna dANTb.

In FIG. 9, the incoming sample inSPLa(t1) is received at the time point t1(a), and the incoming sample inSPLb(t1) is received at the time point t1(b). The arrival time point t1(a) corresponding to the antenna dANTa is defined as the receiving time point of the incoming sample inSPLa(t1), and the arrival time point corresponding to the antenna dANTb (that is, t1 (b)) is defined as the receiving time point of the incoming sample inSPLb(t1). The receiving time points corresponding to the incoming samples inSPLa(t1)~inSPLa (t5), inSPLb(t1)~inSPLb(t5) are respectively annotated as t1(a)~t5(a), t1(b)~t5(b).

As the incoming sample inSPLa(t1) has the highest strength among the incoming samples inSPLa(t1)~inSPLa (t5), its corresponding receiving time point t1(a) is defined as the valid arrival time point $t_{a1}$ (that is, t1(a)=$t_{a1}$). Similarly, as the incoming sample inSPLb(t1) has the highest strength among the incoming samples inSPLb(t1)~inSPLb (t5), its corresponding receiving time point t1(b) is defined as the valid arrival time point $t_{b1}$ (that is, t1(b)=$t_{b1}$).

FIGS. 8 and 9 demonstrate the valid receiving time points ($t_{a1}$, $t_{b1}$) corresponding to the Wi-Fi signal received from an AP device. The AOA-triangulation-based Wi-Fi IPS involves the DUT 23 and at least two AP devices. In practical applications, the number of AP devices utilized in the AOA-triangulation-based Wi-Fi IPS is not limited.

Figure 10:
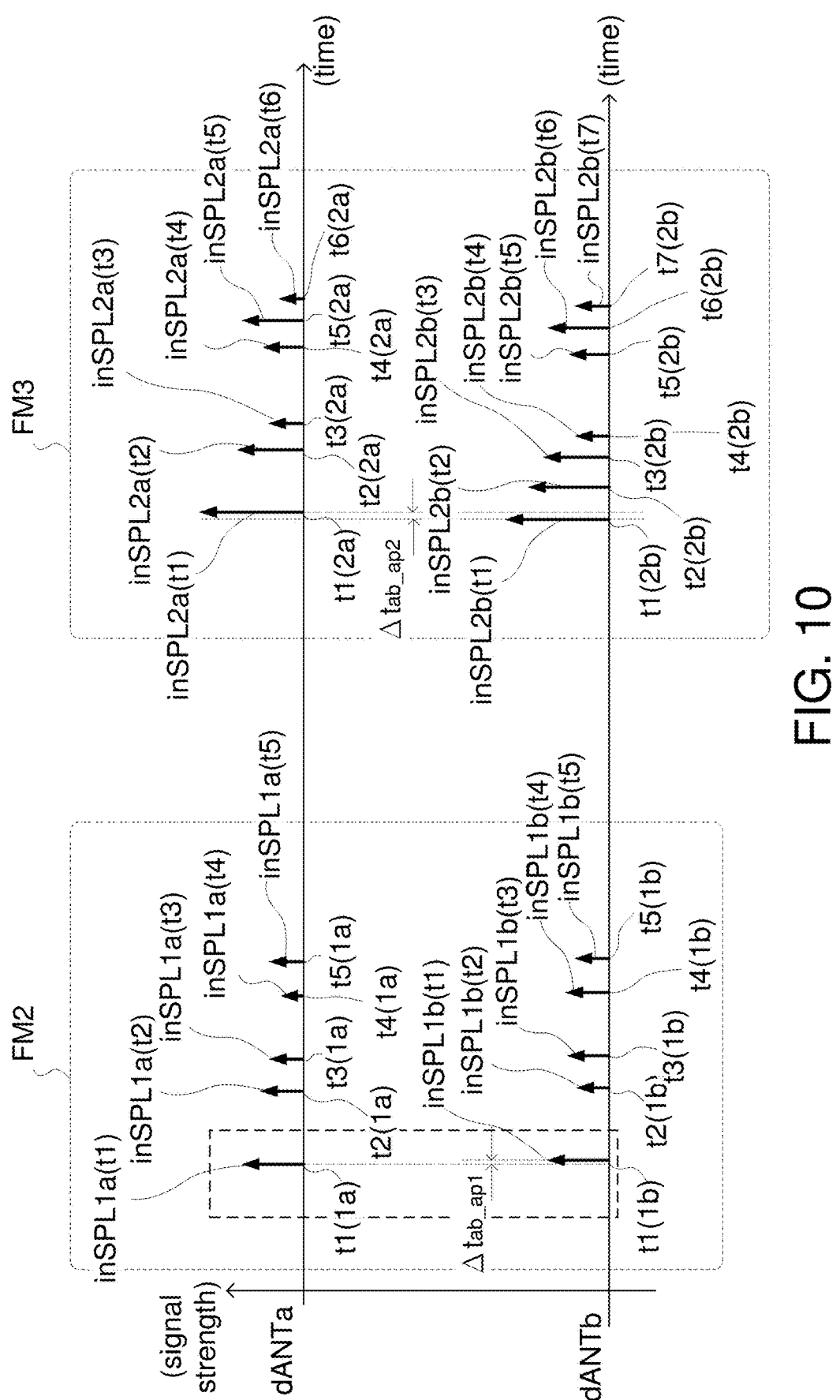
FIG. 10 is a schematic diagram illustrating that the antenna dANTa receives a sequence of incoming samples {inSPL1a(t1), inSPL1a(t2), inSPL1a(t3), inSPL1a(t4), inSPL1a(t5)} in response to the first Wi-Fi signal ap1SIG from the AP1 device and another sequence of incoming samples {inSPL2a(t1), inSPL2a(t2), inSPL2a(t3), inSPL2a (t4), inSPL2a(t5), inSPL2a(t6)} in response to the second Wi-Fi signal ap2SIG from the AP2 device, and the antenna dANTb receives a sequence of incoming samples {inSPL1b (t1), inSPL1b(t2), inSPL1b(t3), inSPL1b(t4), inSPL1b(t5)} in response to the first Wi-Fi signal ap1SIG from the AP1 device and another sequence of incoming samples {inSPL2b (t1), inSPL2b(t2), inSPL2b(t3), inSPL2b(t4), inSPL2b(t5), inSPL2b(t6), inSPL2b(t7)} in response to the second Wi-Fi signal ap2SIG from the AP2 device.

FIG. 10 is a schematic diagram illustrating that the antenna dANTa receives a sequence of incoming samples {inSPL1a(t1), inSPL1a(t2), inSPL1a(t3), inSPL1a(t4), inSPL1a(t5)} in response to the first Wi-Fi signal ap1SIG from the AP1 device and another sequence of incoming samples {inSPL2a(t1), inSPL2a(t2), inSPL2a(t3), inSPL2a (t4), inSPL2a(t5), inSPL2a(t6)} in response to the second Wi-Fi signal ap2SIG from the AP2 device, and the antenna dANTb receives a sequence of incoming samples {inSPL1b (t1), inSPL1 b(t2), inSPL1 b(t3), inSPL1 b(t4), inSPL1 b(t5)} in response to the first Wi-Fi signal ap1SIG from the AP1 device and another sequence of incoming samples {inSPL2b(t1), inSPL2b(t2), inSPL2b(t3), inSPL2b(t4), inSPL2b(t5), inSPL2b(t6), inSPL2b(t7)} in response to the second Wi-Fi signal ap2SIG from the AP2 device.

In FIG. 10, the vertical axis represents the signal strength, and the two horizontal axes represent timing. The upper timing axis corresponds to the incoming samples received by the antenna dANTa, and the lower timing axis corresponds to the incoming samples received by the antenna dANTb.

At the upper timing axis, two sequences of incoming samples are shown. The left part of the upper timing axis shows that the antenna dANTa receives a sequence of incoming samples {inSPL1a(t1), inSPL1a(t2), inSPL1a(t3), inSPL1a(t4), inSPL1a(t5)} originating from the first Wi-Fi signal ap1SIG. The right part of the upper timing axis shows that the antenna dANTa receives another sequence of incoming samples {inSPL2a(t1), inSPL2a(t2), inSPL2a(t3), inSPL2a(t4), inSPL2a(t5), inSPL2a(t6)} originating from the second Wi-Fi signal ap2SIG.

Similarly, at the lower timing axis, two sequences of incoming samples are shown. The left part of the lower timing axis shows that the antenna dANTb receives a sequence of incoming samples {inSPL1b(t1), inSPL1b(t2), inSPL1b(t3), inSPL1b(t4), inSPL1b(t5)} originating from the first Wi-Fi signal ap1SIG. The right part of the lower timing axis shows that the antenna dANTb receives another sequence of incoming samples {inSPL2b(t1), inSPL2b(t2), inSPL2b(t3), inSPL2b(t4), inSPL2b(t5), inSPL2b(t6), inSPL2b(t7)} originating from the second Wi-Fi signal ap2SIG.

In FIG. 10, the duration when the DUT 23 intensively receives the incoming samples corresponding to the AP1 device 21$a$ is separate from the duration when the DUT 23 intensively receives the incoming samples corresponding to the AP2 device 21$c$. To further clarify, the incoming samples originating from the first Wi-Fi signal ap1SIG transmitted from the AP1 device 21$a$ are circulated by the dotted frame FM2, and the incoming samples originating from the second Wi-Fi signal ap2SIG transmitted from the AP2 device 21$c$ are circulated by the dotted frame FM3.

The dotted frame FM2 shows that the DUT 23 intensively receives the incoming samples corresponding to the first Wi-Fi signal ap1SIG from the AP1 device 21$a$ in a short duration, and the dotted frame FM3 shows that the DUT 23 intensively receives the incoming samples corresponding to the second Wi-Fi signal ap2SIG from the AP2 device 21$c$ in another short duration. Therefore, there is a receiving time difference between the sequence of incoming samples corresponding to the first Wi-Fi signal ap1SIG and the sequence of incoming samples corresponding to the second Wi-Fi signal ap2SIG. The signal relationships shown in FIG. 10 are summarized in Table 3.

TABLE 3

| | incoming samples originated from the first Wi-Fi signal ap1SIG sent from AP1 device | receiving time point of the incoming sample | incoming samples originated from the second Wi-Fi signal ap2SIG sent from the AP2 device | receiving time point of the incoming sample |
|---|---|---|---|---|
| Incoming samples received by antenna dANTa | inSPL1a(t1) | t1(1a) | inSPL2a(t1) | t1(2a) |
| | inSPL1a(t2) | t2(1a) | inSPL2a(t2) | t2(2a) |
| | inSPL1a(t3) | t3(1a) | inSPL2a(t3) | t3(2a) |

TABLE 3-continued

|  | incoming samples originated from the first Wi-Fi signal ap1SIG sent from AP1 device | receiving time point of the incoming sample | incoming samples originated from the second Wi-Fi signal ap2SIG sent from the AP2 device | receiving time point of the incoming sample |
|---|---|---|---|---|
| (at the upper timing axis) | inSPL1a(t4) | t4(1a) | inSPL2a(t4) | t4(2a) |
|  | inSPL1a(t5) | t5(1a) | inSPL2a(t5) | t5(2a) |
|  |  |  | inSPL2a(t6) | t6(2a) |
| incoming samples received by antenna dANTb (at the lower timing axis) | inSPL1b(t1) | t1(1b) | inSPL2b(t1) | t1(2b) |
|  | inSPL1b(t2) | t2(1b) | inSPL2b(t2) | t2(2b) |
|  | inSPL1b(t3) | t3(1b) | inSPL2b(t3) | t3(2b) |
|  | inSPL1b(t4) | t4(1b) | inSPL2b(t4) | t4(2b) |
|  | inSPL1b(t5) | t5(1b) | inSPL2b(t5) | t5(2b) |
|  |  |  | inSPL2b(t6) | t6(2b) |
|  |  |  | inSPL2b(t7) | t7(2b) |

In the dotted frame FM2, a first arrival time difference $\Delta t_{ab\_ap1}$ is calculated. The control circuit 431, 531 considers the arrival time point t1(1a) of the incoming sample inSPL1a (t1) as the time point that the antenna dANTa receives the first-first Wi-Fi signal ap1SIGa, and the control circuit 431, 531 considers the arrival time point t1(1b) of incoming sample inSPL1b(t1) as the time point that the antenna dANTb receives the first-second Wi-Fi signal ap1SIGb. The first arrival time difference $\Delta t_{ab\_ap1}$ represents the difference between the arrival time point of the incoming sample inSPL1a(t1) and the arrival time point of the incoming sample inSPL1b(t1). That is, $\Delta t_{ab\_ap1}$=t1(1a)–t1(1b). Once the first arrival time difference $\Delta t_{ab\_ap1}$ is obtained, the first angle of arrival $\theta_{aoa1}$ can be calculated based on those illustrated in FIG. 7A.

In the dotted frame FM3, a second arrival time difference $\Delta t_{ab\_ap2}$ is calculated. The control circuit 431, 531 considers the arrival time point t1 (2a) of the incoming sample inSPL2a(t1) as the time point that the antenna dANTa receives the second-first Wi-Fi signal ap2SIGa, and the control circuit 431, 531 considers the arrival time point t1(2b) of incoming sample inSPL2b(t1) as the time point that the antenna dANTb receives the second-second Wi-Fi signal ap2SIGb. The second arrival time difference $\Delta t_{ab\_ap2}$ represents the difference between the arrival time point of the incoming sample inSPL2a(t1) and the arrival time point of the incoming sample inSPL2b(t1). That is, $\Delta t_{ab\_ap2}$=t1 (2a)–t1(2b). Once the second arrival time difference $\Delta t_{ab\_ap2}$ is obtained, the second angle of arrival $\theta_{aoa2}$ can be calculated based on those illustrated in FIGS. 7A and 7B. In Table 4, the calculation procedure of the first/second path differences $\Delta d_{ab1}$, $\Delta d_{ab2}$ based on the first arrival time difference $\Delta t_{ab\_ap1}$ and the second arrival time difference $\Delta t_{ab\_ap2}$ (see FIG. 10) are summarized.

TABLE 4

| reference device | AP1 device 21a | | AP2 device 21c | |
|---|---|---|---|---|
| reference device coordinates | $(X_{ap1}, Y_{ap1})$ | | $(X_{ap2}, Y_{ap2})$ | |
| antenna | first antenna | second antenna | first antenna | secondantenna |
|  | dANTa | dANTb | dANTa | dANTb |
| received Wi-Fi signal | first-first | first-second | second-first | second-second |
|  | Wi-Fi signal | Wi-Fi signal | Wi-Fi signal | Wi-Fi signal |
|  | ap1SIGa | ap1SIGb | ap2SIGa | ap2SIGb |
| Calculate path difference $\Delta d_{ab1}$, $\Delta d_{ab2}$ based on arrival time differences $\Delta t_{ab\_ap1}$, $\Delta t_{ab\_ap2}$ | arrival time point $t_{a1}$ of first-first Wi-Fi signal (ap1SIGa) | arrival time point $t_{b1}$ of first-second Wi-Fi signal (ap1SIGb) | arrival time point $t_{a2}$ of second-first Wi-Fi signal (ap2SIGa) | arrival time point $t_{b2}$ of second-second Wi-Fi signal (ap2SIGb) |
|  | first arrival time difference $\Delta t_{ab\_ap1} = t1(1a) - t1(1b)$ first path difference $\Delta d_{ab1} = c^*\Delta t_{ab\_ap1}$ | | second arrival time difference $\Delta t_{ab\_ap2} = t1(2a) - t1(2b)$ second path difference $\Delta d_{ab2} = c^*\Delta t_{ab\_ap2}$ | |
| angles of arrival $\theta_{aoa1}$, $\theta_{aoa2}$ | first angle of arrival $$\theta_{aoa1} = \frac{\pi}{2} - \sin^{-1}\left(\frac{\Delta d_{ab1}}{dANT}\right) = \frac{\pi}{2} - \sin^{-1}\left(\frac{c * \Delta t_{ab\_ap1}}{dANT}\right)$$ | | second angle of arrival $$\theta_{aoa2} = \frac{\pi}{2} - \sin^{-1}\left(\frac{\Delta d_{ab2}}{dANT}\right) = \frac{\pi}{2} - \sin^{-1}\left(\frac{c * \Delta t_{ab\_ap2}}{dANT}\right)$$ | |
| AOA-triangulation-based IPS | The coordinate position of the DUT $(X_{DUT}, Y_{DUT})$ is determined by performing triangulation calculation to the first angle of arrival $\theta_{aoa1}$, the second angle of arrival $\theta_{aoa2}$, and the reference device coordinates $(X_{ap1}, Y_{ap1})$, $(X_{ap2}, Y_{ap2})$. | | | |

In the above illustrations, the path differences $\Delta d_{ab1}$, $\Delta d_{ab2}$ are assumed to be calculated based on arrival time differences $\Delta t_{ab\_ap1}$, $\Delta t_{ab\_ap2}$. However, the calculation procedure of the path differences $\Delta d_{ab1}$, $\Delta d_{ab2}$ is not limited in practical applications. In Table 5, the calculation procedure of the path differences $\Delta d_{ab1}$, $\Delta d_{ab2}$ based on phase differences $\Delta\psi_{ab\_ap1}$, $\Delta\psi_{ab\_ap2}$ are summarized. As details about the calculation procedure based on the first phase difference $\Delta\psi_{ab\_ap1}$ and the second phase difference $\Delta\psi_{ab\_ap2}$ can be analog to those based on the first arrival time difference $\Delta t_{ab\_ap1}$ and the second arrival time difference $\Delta t_{ab\_ap2}$, related illustrations are omitted.

of IPS is required. In the present application, an angle-to-angle (AoA) triangulation-based IPS is provided.

In Table 6, the GPS-trilateration-based IPS, the fingerprinting-based IPS, and the AOA-triangulation-based IPS are compared.

TABLE 6

| Type of IPS | Summary |
|---|---|
| GPS-trilateration-based IPS | Absolute coordinates of reference positions are required. The absolute coordinates of reference |

TABLE 5

| reference device | API device 21a | | AP2 device 21c | |
|---|---|---|---|---|
| reference device coordinates | $(X_{ap1}, Y_{ap1})$ | | $(X_{ap2}, Y_{ap2})$ | |
| antenna | first antenna dANTa | second antenna dANTb | first antenna dANTa | second antenna dANTb |
| received Wi-Fi signal | first-first Wi-Fi signal ap1SIGa | first-second Wi-Fi signal ap1SIGb | second-first Wi-Fi signal ap2SIGa | second-second Wi-Fi signal ap2SIGb |
| calculate path differences $\Delta d_{ab1}$, $\Delta d_{ab2}$ based on phase differences $\Delta\Psi_{ab\_ap1}$, $\Delta\Psi_{ab\_ap2}$ | phase of first-first Wi-Fi signal (ap1SIGa): first-first phase $\Psi_{a1}$ first phase difference $\Delta\Psi_{ab\_ap1} = \Psi_{a1} - \Psi_{b1}$ first difference $\Delta d_{ab1} = \Delta\Psi_{ab\_ap1} * \dfrac{\lambda}{2\pi}$ | phase of first-second Wi-Fi signal (ap1SIGb): first-second phase $\Psi_{b1}$ | phase of second-first Wi-Fi signal (ap2SIGa): second-first phase $\Psi_{a2}$ second phase difference $\Delta\Psi_{ab\_ap2} = \Psi_{a2} - \Psi_{b2}$ second difference $\Delta d_{ab2} = \Delta\Psi_{ab\_ap2} * \dfrac{\lambda}{2\pi}$ | phase of second-second Wi-Fi signal (ap2SIGb): second-second phase $\Psi_{b2}$ |
| angles of arrival $\theta_{aoa1}$, $\theta_{aoa2}$ | first angle of arrival $\theta_{aoa1} = \dfrac{\pi}{2} - \sin^{-1}\left(\dfrac{\Delta d_{ab1}}{dANT}\right) =$ $\pi/2 - \sin^{-1}\left(\Delta\Psi_{ab\_ap1} * \dfrac{\lambda}{2\pi} * \dfrac{1}{dANT}\right)$ | | second angle of arrival $\theta_{aoa2} = \dfrac{\pi}{2} - \sin^{-1}\left(\dfrac{\Delta d_{ab2}}{dANT}\right) =$ $\pi/2 - \sin^{-1}\left(\Delta\Psi_{ab\_ap2} * \dfrac{\lambda}{2\pi} * \dfrac{1}{dANT}\right)$ | |
| AOA-triangulation-based IPS | The coordinate position of the DUT $(X_{DUT}, Y_{DUT})$ is determined by performing triangulation calculation to the first angle of arrival $\theta_{aoa1}$, the second angle of arrival $\theta_{aoa2}$, and the reference device coordinates $(X_{ap1}, Y_{ap1})$, $(X_{ap2}, Y_{ap2})$. | | | |

In practical applications, the sequences of the incoming samples received by the antennas dANTa, dANTb of the DUT 23 may vary. For example, the number of incoming samples originating from the Wi-Fi signals transmitted by different AP devices but received by the same antenna may or may not be equivalent. Or, the number of incoming samples originating from the same Wi-Fi signal but received by different antennas dANTa, dANTb of the same DUT 23 may or may not be equivalent.

In practical applications, the order of the receiving time points of the incoming samples corresponding to the AP1 device and the AP2 device may vary. For example, the receiving time points corresponding to incoming samples corresponding to the Wi-Fi signal ap2SIG might be earlier than the receiving time points corresponding to the incoming samples corresponding to the Wi-Fi signal ap1SIG.

According to the present disclosure, the AOA-triangulation-based IPS can be performed in a real-time manner. When a user stays in the indoor environment, the DUT may repetitively perform the AOA-triangulation-based IPS so that the coordinate position $(X_{DUT}, Y_{DUT})$ of the DUT is continuously updated. Therefore, a DUT supporting the AOA-triangulation-based IPS helps the user to know his/her latest location in the indoor environment.

Both GPS-trilateration-based IPS and fingerprinting-based IPS have their shortages. Thus, further improvement

TABLE 6-continued

| Type of IPS | Summary |
|---|---|
| (conventional) fingerprinting based IPS (conventional) | positions still need to use GPS coordinates. The training stage is required, and RSSI data corresponding to reference positions need to be repetitively collected whenever any AP device is replaced or added. |
| AOA-triangulation-based IPS (present disclosure) | Relative coordinates of reference positions or absolute coordinates of reference positions can be utilized. In comparison with the GPS-trilateration-based IPS, the adoption of relative coordinates of reference positions is relatively simple. In comparison with the fingerprinting base IPS, the burden of creating the fingerprint database can be eased. |

In comparison with the conventional IPS (GPS-trilateration-based IPS, fingerprinting-based IPS), the IPS according to the present application can efficiently and precisely estimate the indoor position without using the absolute coordinates of the reference positions and the fingerprint database establishment stage. Moreover, the AOA-triangulation-based IPS only needs to modify the design of the user's device, such as a mobile phone, a tablet computer, or a laptop. Therefore, the numerous legacy AP devices in a Wi-Fi system are compatible with the AOA-triangulationbased IPS. This implies that the effort to apply the AOA-triangulation-based IPS to the existing Wi-Fi systems is relatively low.

When the relative coordinates are adopted, the AOA-triangulation-based IPS can be used together with a propri-etary map system. For example, the AOA-triangulation-based IPS is used together with a navigation tool application showing the layout of a shopping mall. When the absolute coordinates are adopted, different types of existing map systems (for example, Google map, Baidu Maps, High moral map, and so forth) can be utilized.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A mobile station device, comprising:
a first antenna, configured for receiving a first-first Wi-Fi signal being transmitted along a first-first transmission path, and receiving a second-first Wi-Fi signal being transmitted along a second-first transmission path;
a second antenna, configured for receiving a first-second Wi-Fi signal being transmitted along a first-second transmission path, and receiving a second-second Wi-Fi signal being transmitted along a second-second transmission path, wherein
the first-first Wi-Fi signal and the first-second Wi-Fi signal originate from a first Wi-Fi signal transmitted by a first access point device, and
the second-first Wi-Fi signal and the second-second Wi-Fi signal originate from a second Wi-Fi signal transmitted by a second access point device; and
a communication interface, electrically connected to the first antenna and the second antenna, configured for calculating a first angle of arrival based on a separation distance between the first antenna and the second antenna and a first path difference between the first-first Wi-Fi signal and the first-second Wi-Fi signal, and calculating a second angle of arrival based on the separation distance between the first antenna and the second antenna and a second path difference between the second-first Wi-Fi signal and the second-second Wi-Fi signal; and
a control circuit, electrically connected to the communication interface, configured for performing a triangulation calculation to estimate a coordinate position of the mobile station device based on the first angle of arrival, the second angle of arrival, a coordinate position of the first access point device, and a coordinate position of the second access point device.

2. The mobile station device according to claim 1, wherein
the communication interface performs a trigonometric function calculation to the first path difference and the separation distance between the first antenna and the second antenna to estimate the first angle of arrival, and
the communication interface performs another trigonometric function calculation to the second path difference and the separation distance between the first antenna and the second antenna to estimate the second angle of arrival.

3. The mobile station device according to claim 1, wherein
the first antenna receives the first-first Wi-Fi signal at a first-first time point, the first antenna receives the second-first Wi-Fi signal at a second-first time point,
the second antenna receives the first-second Wi-Fi signal at a first-second time point,
the second antenna receives the second-second WI-Fi signal at a second-second time point,
the communication interface estimates the first path difference based on a first time difference between the first-first time point and the first-second time point, and
the communication interface estimates the second path difference based on a second time difference between the second-first time point and the second-second time point.

4. The mobile station device according to claim 3, wherein
the communication interface calculates the first angle of arrival based on a speed of light, the separation distance between the first antenna and the second antenna, and the first time difference, and
the communication interface calculates the second angle of arrival based on the speed of light, the separation distance between the first antenna and the second antenna, and the second time difference.

5. The mobile station device according to claim 3, wherein
the first-first time point and the first-second time point are earlier than the second-first time point and the second-second time point, or
the first-first time point and the first-second time point are later than the second-first time point and the second-second time point.

6. The mobile station device according to claim 1, wherein
the control circuit executes an upper layer software to estimate the coordinate position of the mobile station device based on the first angle of arrival, the second angle of arrival, a coordinate position of the first access point device, and a coordinate position of the second access point device.

7. The mobile station device according to claim 6, wherein
the first access point device and the second access point device are placed in an indoor environment, wherein
the coordinate position of the first access point device and the coordinate position of the second access point device are predefined before the station device physically enters the indoor environment.

8. The mobile station device according to claim 7, wherein
the coordinate position of the first access point device and the coordinate position of the second access point device are represented in an absolute coordinate system or in a relative coordinate system.

9. The mobile station device according to claim 1, wherein
the first Wi-Fi signal carries a plurality of beacon packets when the station device is in communication with the second access point device or a third access point device.

10. The mobile station device according to claim 1, wherein
the first Wi-Fi signal carries a plurality of data packets when the station device is in communication with the first access point device.

11. The mobile station device according to claim 1, wherein the first-first Wi-Fi signal corresponds to a first-first phase, the first-second Wi-Fi signal corresponds to a first-second phase, and the communication interface estimates the first path difference based on a first phase difference between the first-first phase and the first-second phase, and the second-first Wi-Fi signal corresponds to a second-first phase, the second-second Wi-Fi signal corresponds to a second-second phase, and the communication interface estimates the second path difference based on a second phase difference between the second-first phase and the second-second phase.

12. The mobile station device according to claim 1, wherein the communication interface receives a plurality of first-first incoming samples and a plurality of second-first incoming samples from the first antenna, and the communication interface receives a plurality of first-second incoming samples and a plurality of second-second incoming samples from the second antenna, wherein the first antenna transforms the first-first Wi-Fi signal to the plurality of first-first incoming samples, the first antenna transforms the second-first Wi-Fi signal to the plurality of second-first incoming samples, the second antenna transforms the first-second Wi-Fi signal to the plurality of first-second incoming samples, and the second antenna transforms the second-second Wi-Fi signal to the plurality of second- second incoming samples.

13. The mobile station device according to claim 12, wherein the communication interface compares signal strengths of the plurality of first-first incoming samples and selects one of the plurality of first-first incoming samples having the highest signal strength, and the communication interface compares signal strengths of the plurality of first-second incoming samples and selects one of the plurality of first-second incoming samples having the highest signal strength, the communication interface compares signal strengths of the plurality of second-first incoming samples and selects one of the plurality of second-first incoming samples having the highest signal strength, and the communication interface compares signal strengths of the plurality of the plurality of second-second incoming samples and selects one of the plurality of second- second incoming samples having the highest signal strength.

14. The mobile station device according to claim 13, wherein a receiving time point of the selected one of the plurality of first-first incoming samples is defined as the first-first time point, a receiving time point of the selected one of the plurality of first-second incoming samples is defined as the first-second time point, a receiving time point of the selected one of the plurality of second-first incoming samples is defined as the second-first time point, and a receiving time point of the selected one of the plurality of second-second incoming samples is defined as the second-second time point.

15. A Wi-Fi system, comprising:

a first access point device, configured for transmitting at least a first-first Wi-Fi signal and a second-first Wi-Fi signal;

a second access point device, configured for transmitting at least a first-second Wi-Fi signal and a second-second Wi-Fi signal; and a mobile station device, comprising:

a first antenna, configured for receiving a first-first Wi-Fi signal being transmitted along a first-first transmission path, and receiving a second-first Wi-Fi signal being transmitted along a second-first transmission path;

a second antenna, configured for receiving a first-second Wi-Fi signal being transmitted along a first-second transmission path, and receiving a second-second Wi-Fi signal being transmitted along a second-second transmission path, wherein the first-first Wi-Fi signal and the first-second Wi-Fi signal originate from the first Wi-Fi signal, and the second-first Wi-Fi signal and the second-second Wi-Fi signal originate from the second Wi-Fi signal; and a communication interface, electrically connected to the first antenna and the second antenna, configured for calculating a first angle of arrival based on a separation distance between the first antenna and the second antenna and a first path difference between the first-first Wi-Fi signal and the first-second Wi-Fi signal, and calculating a second angle of arrival based on the separation distance between the first antenna and the second antenna and a second path difference between the second-first Wi-Fi signal and the second-second Wi-Fi signal; and a control circuit, electrically connected to the communication interface, configured for performing a triangulation calculation to estimate a coordinate position of the mobile station device based on the first angle of arrival, the second angle of arrival, a coordinate position of the first access point device, and a coordinate position of the second access point device.

16. The Wi-Fi system according to claim 15, wherein the communication interface performs a trigonometric function calculation to the first path difference and the separation distance between the first antenna and the second antenna to estimate the first angle of arrival, and the communication interface performs another trigonometric function calculation to the second path difference and the separation distance between the first antenna and the second antenna to estimate the second angle of arrival.

17. The Wi-Fi system according to claim 15, wherein the first access point device comprises:

a third antenna; and a fourth antenna, wherein at least one of the third antenna and the fourth antenna is configured for transmitting the first Wi-Fi signal.

18. The Wi-Fi system according to claim 17, wherein one of the third antenna and the fourth antenna transmits the first Wi-Fi signal to carry a plurality of beacon packets when the mobile station device is not in communication with the first access point device.

19. The Wi-Fi system according to claim 17, wherein both the third antenna and the fourth antenna transmit the first Wi-Fi signal to carry a plurality of data packets corresponding to the mobile station device when the mobile station device is in communication with the first access point device.

20. A positioning method applied to a Wi-Fi system comprising a first access point device, a second access point device, and a mobile station device, wherein the positioning method comprises steps of:

the first access point device transmitting at least a first-first Wi-Fi signal and a second-first Wi-Fi signal;

the second access point device transmitting at least a first-second Wi-Fi signal and a second-second Wi-Fi signal;

through a first antenna, the mobile station device receiving a first-first Wi-Fi signal being transmitted along a first-first transmission path, and receiving a second-first Wi-Fi signal being transmitted along a second-first transmission path;

through a second antenna, the mobile station device receiving a first-second Wi-Fi signal being transmitted along a first-second transmission path, and receiving a second-second Wi-Fi signal being transmitted along a second-second transmission path, wherein the first-first Wi-Fi signal and the first-second Wi-Fi signal originate from the first Wi-Fi signal, and the second-first Wi-Fi signal and the second-second Wi-Fi signal originate from the second Wi-Fi signal; and the mobile station device calculating a first angle of arrival based on a separation distance between the first antenna and the second antenna and a first path difference between the first-first Wi-Fi signal and the first-second Wi-Fi signal;

the mobile station device calculating a second angle of arrival based on the separation distance between the first antenna and the second antenna and a second path difference between the second-first Wi-Fi signal and the second-second Wi-Fi signal; and the mobile station device performs a triangulation calculation to estimate a coordinate position of the mobile station device based on the first angle of arrival, the second angle of arrival, a coordinate position of the first access point device, and a coordinate position of the second access point device.

* * * * *